(12) United States Patent
Worchesky et al.

(10) Patent No.: US 6,549,708 B2
(45) Date of Patent: Apr. 15, 2003

(54) DUAL-SIDE WAVEGUIDE-BASED WAVELENGTH DEMULTIPLEXER

(75) Inventors: Terrance L. Worchesky, Ellicott City, MD (US); Lance A. Wood, Winter Park, CO (US); Feng Liu, Baltimore, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/923,168

(22) Filed: Aug. 6, 2001

(65) Prior Publication Data

US 2002/0041734 A1 Apr. 11, 2002

Related U.S. Application Data

(60) Provisional application No. 60/227,048, filed on Aug. 21, 2000.

(51) Int. Cl.[7] .............................. G02B 6/34; G02B 6/293
(52) U.S. Cl. .............................. 385/37; 385/24; 385/11; 359/130
(58) Field of Search .................... 385/24, 37, 129–132, 385/16–23, 14; 359/115–117, 122–134

(56) References Cited

U.S. PATENT DOCUMENTS

| | | | |
|---|---|---|---|
| 4,747,649 A | | 5/1988 | Heinen et al. ............ 350/96.12 |
| 5,333,216 A | * | 7/1994 | Sakata et al. ................ 385/131 |
| 5,416,866 A | | 5/1995 | Sahlen ......................... 385/37 |
| 5,495,543 A | * | 2/1996 | Alferness et al. ............. 385/37 |
| 5,517,589 A | * | 5/1996 | Takeuchi ...................... 385/24 |
| 5,621,828 A | | 4/1997 | Baets et al. ................... 385/14 |
| 5,710,849 A | | 1/1998 | Little et al. ................... 385/50 |
| 5,859,941 A | * | 1/1999 | Horita et al. ................. 385/24 |
| 5,887,103 A | | 3/1999 | Jeong et al. ................. 385/122 |
| 5,937,129 A | * | 8/1999 | Jeong et al. ................... 385/37 |
| 6,072,925 A | * | 6/2000 | Sakata ......................... 385/24 |
| 6,101,302 A | * | 8/2000 | Park et al. .................... 385/37 |
| 6,408,116 B1 | * | 6/2002 | Izawa ........................... 385/37 |

* cited by examiner

*Primary Examiner*—Akm E. Ullah
*Assistant Examiner*—Michelle R. Connelly-Cushwa
(74) *Attorney, Agent, or Firm*—Marsh Fischmann & Breyfogle LLP

(57) ABSTRACT

A demultiplexer is disclosed. The demultiplexer incorporates a reflective grating that is associated with a first waveguide through which a multiplexed optical signal may be transmitted. Individual wavelengths of light that have been reflected by the reflective grating are able to pass through a barrier layer which separates the first waveguide from a second waveguide. A plurality of photodetectors are associated with the second waveguide to read out the individual, wavelength-specific optical signals. The reflective grating is preferably formed on a surface of the first waveguide which projects away from the second waveguide, while the photodetectors are preferably formed at least in part by processing a surface of the second waveguide that projects away from the first waveguide. Both polarities of light are preferably accounted for/collected by the grating as well.

35 Claims, 17 Drawing Sheets

DUAL-SIDE WAVEGUIDE-BASED WAVELENGTH DEMULTIPLEXER

CROSS-REFERENCE TO RELATED APPLICATIONS

This utility patent application claims priority from and is based upon U.S. Provisional Patent Application Serial No. 60/227,048, entitled "DUAL-SIDE WAVEGUIDE-BASED WAVELENGTH DEMULTIPLEXER, and that was filed on Aug. 21, 2000, the entire disclosure of which is incorporated by reference in its entirety herein.

FIELD OF THE INVENTION

The present invention generally relates to the field of demultiplexers and, more particularly, to a demultiplexer that includes a grating assembly formed on a first side thereof and a photodetector assembly formed on a second side thereof which is opposite the first side.

BACKGROUND OF THE INVENTION

Various types of demultiplexer designs have been proposed. One common configuration is to have the grating that provides the separation function within an interior location of the demultiplexer, such as within a waveguide that is the optical carrier for the multiplexed or combined optical signal. Gratings of this type require at least some type of crystal regrowth. Crystal regrowth is a complex and difficult process, and the result of any such regrowth may yield a demultiplexer that suffers one or more types of deficiencies in its performance.

Another common configuration for a demultiplexer provides a demultiplexing function which divides all N wavelengths among N separate detection channels (i.e., the multiplexed signal is split and sent to N separate detection channels). The $M^{th}$ signal channel thereby rejects the other N−1 wavelengths in its channel and detects only the $M^{th}$ wavelength. Thus (N−1)/N portion of the original signal is rejected. This has an adverse impact on the power demands for the demultiplexer.

BRIEF SUMMARY OF THE INVENTION

A first aspect of the present invention is embodied by a particular demultiplexer design. This demultiplexer includes first and second waveguides that may be viewed as being in a stacked configuration, with the second waveguide being disposed a higher elevation in the stack than the first waveguide. "Stacked" does not necessarily mean that the second waveguide is directly above the first waveguide or vice versa, although this typically will be the case. A grating assembly is disposed on either the upper or the lower surface of the stack, but nonetheless on the first waveguide.

Various refinements exist of the features noted in relation to the first aspect of the present invention. Further features may also be incorporated in the first aspect of the present invention as well. These refinements and additional features may exist individually or in any combination. Both the first and second waveguides are optical conduits of sorts. Multiplexed or combined optical signals may be directed into the first waveguide for demultiplexing by the grating assembly, such that the first waveguide may be characterized as an input channel. These individual demultiplexed optical signals (e.g., of individual wavelengths) may be directed into the second waveguide for a readout of the same, such that the second waveguide may be characterized as a plurality of output channels. Each of these output channels may be associated with a single individual wavelength or a relatively narrow band of wavelengths that is on the order of 1–2 nanometers wide. Hereafter, any discussion of "individual wavelengths" progressing to the second waveguide for readout encompasses both individual wavelengths and this relatively narrow wavelength band on the order of 1–2 nanometers wide.

Definition of these plurality of output channels in the second waveguide may be accomplished by having the second waveguide actually be in the form of a plurality of second waveguide sections that are spaced in a direction in which the combined optical signal progresses through the first waveguide. A photodetector may be attached to/formed on/in each of these second waveguide sections for actually accomplishing this readout. A photodetector may be part of its corresponding second waveguide section (i.e., a given photodetector may be smaller than its corresponding second waveguide section), or may in fact define the entirety of its corresponding second waveguide section. It may be possible to utilize a continuous second waveguide with a plurality of photodetectors that are spaced in the direction in which the combined optical signal is progressing through the first waveguide for other applications of the structure associated with the first aspect, although there may be difficulties with this configuration for the subject demultiplexing application. Preferably, a photodetector assembly is integrally formed in association with the second waveguide, including defining the entirety of the second waveguide (e.g., a given photodetector may define the entirety of its corresponding second waveguide section) and defining only a portion of the second waveguide in which case the photodetector would be disposed on/extend within the second waveguide. As such, a photodetector assembly is effectively disposed on one side of the stack, and the grating assembly is disposed on the opposite side of the stack to provide a dual-side demultiplexer.

What may be characterized as a barrier layer or index control channel may be and preferably is disposed between the first and second waveguides in the case of the first aspect. In the case where the second waveguide is continuous, the barrier layer would be continuous. Where the second waveguide is in the form of a plurality of spaced second waveguide sections, the barrier layer would typically be in the form of a plurality of spaced barrier layer sections (e.g., such that a barrier layer section is disposed between each second waveguide section and the first waveguide), although it could still be a continuous structure as well. Selective coupling of the first and second waveguides effectively is the function of the barrier layer. Functionally, the barrier layer allows only certain light to pass from the first waveguide into the second waveguide in a particular region of the second waveguide. The remainder of the light is thereby prohibited from progressing from the first waveguide into this region of the second waveguide. Consider the case where the second waveguide is in the form of a plurality of spaced second waveguide sections, and where the barrier layer is similarly in the form of a plurality of spaced barrier layer sections. Light of a certain wavelength may be directed from the grating assembly associated with the first waveguide toward a particular barrier layer section and its overlying second waveguide section. This particular barrier layer section allows this certain wavelength light to progress through the barrier layer section and into its overlying second waveguide section. All other light is prohibited from passing through this barrier layer section into its overlying second waveguide section. One may view the grating assembly as not only separating out a particular wavelength from a combined or multiplexed optical signal, but "processing" this particular wavelength of light into a form which will allow the same to pass from the first waveguide, through the barrier layer, and into its overlying second waveguide section.

The first and second waveguides may be characterized as being asynchronous in the first aspect. Furthermore, the first and second waveguides may and typically will have different refractive indices, may and typically will have different thicknesses, or both. As noted above, the second waveguide may be a continuous structure or may be in the form of a plurality of second waveguide sections that are spaced in a direction in which a multiplexed or combined optical signal is progressing through the first waveguide.

The function of the grating assembly is to somehow separate out the individual optical signals from a combined or multiplexed signal in the case of the first aspect. Preferably this is done by principles of reflection versus transmission. That is, preferably the grating assembly of the first aspect is a reflective grating versus a transmissive grating. The grating assembly may include a plurality of grating subassemblies that are spaced in a direction in which a multiplexed or combined optical signal is progressing through the first waveguide. Each grating subassembly may be wavelength specific (or specific to a given bandwidth as noted). Furthermore, each grating subassembly may account for both polarities of light. One portion of each grating subassembly may be configured to direct light of its associated wavelength and of a first polarity toward the second waveguide. Another portion of each grating subassembly may be configured to direct light of its associated wavelength and of a second, different polarity toward the second waveguide. These portions will typically be aligned in a direction in which a multiplexed or combined optical signal is progressing through the first waveguide. As such, a particular grating subassembly will be specific to a given wavelength, and will account for both polarities of this given wavelength.

One way in which both polarities of light may be accounted for by each grating subassembly is by using a slightly different grating spacing within each grating subassembly. Consider the case where there are a plurality of grating subassemblies, and where each grating subassembly includes first and second grating sections that account for the first and second polarities of light, respectively. The grating spacing used in the first grating section of each grating subassembly may be within a range of about 0.1 to about 0.5 microns different from the grating spacing used in the second grating section of the same grating subassembly. Stated another way, the grating spacing used in the first and second grating sections of each grating subassembly differ by an amount that is of a range of 0.1 microns to about 0.5 microns. Adjacent grating subassemblies will have larger grating spacings to account for addressing different wavelengths of light. The grating spacing used by adjacent grating subassemblies will typically be at least about 1 micron different from each other.

A second aspect of the present invention is embodied by a particular demultiplexer design. This demultiplexer includes first and second waveguides. A grating assembly is associated with the first waveguide. The function of this grating assembly is to somehow separate out the individual optical signals from a combined or multiplexed signal. Both polarities of light are accounted for by the grating assembly associated with the second aspect.

Various refinements exist of the features noted in relation to the second aspect of the present invention. Further features may also be incorporated in the second aspect of the present invention as well. These refinements and additional features may exist individually or in any combination. Initially, the second aspect of the present invention may be used in combination with the above-noted first aspect.

Multiplexed or combined optical signals may be directed into the first waveguide for demultiplexing by the grating assembly of the second aspect, such that the first waveguide may be characterized as an input channel. These individual demultiplexed optical signals (e.g., of individual wavelengths) may be directed into the second waveguide for a readout of the same, such that the second waveguide may be characterized as a plurality of output channels. Each of these output channels may be associated with a single individual wavelength. Definition of these plurality of output channels in the second waveguide may be accomplished by having the second waveguide actually be in the form of a plurality of second waveguide sections that are spaced in a direction in which the combined or multiplexed optical signal progresses through the first waveguide. A photodetector may be attached to/formed on/in each of these second waveguide sections for actually accomplishing this readout. A photodetector may be part of its corresponding second waveguide section (i.e., a given photodetector may be smaller than its corresponding second waveguide section), or may in fact define the entirety of its corresponding second waveguide section as noted. It may be possible to utilize a continuous second waveguide with a plurality of photodetectors that are spaced in the direction in which the combined optical signal is progressing through the first waveguide for other applications of the structure associated with the second aspect, although there may be difficulties with this configuration for the subject demultiplexing application. Preferably, a photodetector assembly is integrally formed in association with the second waveguide (including defining the entirety of the second waveguide (e.g., and a given photodetector may define the entirety of its corresponding second waveguide section) and defining only a portion of the second waveguide in which case the photodetector would be disposed on/extend within the second waveguide), and the grating assembly is integrally formed on a side of the first waveguide that is opposite that which projects toward the second waveguide. As such, a photodetector assembly is effectively disposed on one side of a demultiplexing stack, and the grating assembly is disposed on the opposite side of this demultiplexing stack to provide a dual-sided demultiplexer.

What may be characterized as a barrier layer or index control channel may be and preferably is disposed between the first and second waveguides. In the case where the second waveguide is continuous, the barrier layer would be continuous. Where the second waveguide is in the form of a plurality of spaced second waveguide sections, the barrier layer would typically be in the form of a plurality of spaced barrier layer sections (e.g., such that a barrier layer section is disposed between each second waveguide section and the first waveguide), although it could still be a continuous structure as well. Selective coupling of the first and second waveguides effectively is the function of the barrier layer. Functionally, the barrier layer allows only certain light to pass from the first waveguide into the second waveguide in a particular region of the second waveguide. The remainder of the light is thereby prohibited from progressing from the first waveguide into this region of the second waveguide. Consider the case where the second waveguide in the form of a plurality of spaced second waveguide sections, and where the barrier layer is similarly in the form of a plurality of spaced barrier layer sections. Light of a certain wavelength may be directed from the grating assembly associated with the first waveguide toward a particular barrier layer section and its overlying second waveguide section. This particular barrier layer section allows this certain wavelength light to progress through the barrier layer section and into its overlying second waveguide section. All other light is prohibited from passing through this barrier layer section into its overlying second waveguide section. One may view the grating assembly as not only separating out a particular wavelength from a combined or multiplexed optical signal, but "processing" this particular wavelength of light into a form which will allow the same to pass from the first waveguide, through the barrier layer, and into its overlying second waveguide section.

The first and second waveguides may be characterized as being asynchronous in the second aspect. Furthermore, the first and second waveguides may and typically will have different refractive indices, may and typically will have different thicknesses, or both. As noted above, the second waveguide may be a continuous structure or may be in the form of a plurality of second waveguide sections that are spaced in a direction in which a multiplexed or combined optical signal is progressing through the first waveguide.

The function of the grating assembly is to somehow separate out the individual optical signals from a combined or multiplexed signal in the case of the second aspect. Preferably this is done by principles of reflection versus transmission. That is, preferably the grating assembly of the second aspect is a reflective grating versus a transmissive grating. The grating assembly of the second aspect may include a plurality of grating subassemblies that are spaced in a direction in which a multiplexed or combined optical signal is progressing through the first waveguide. Each grating subassembly may be wavelength specific (or specific to a given bandwidth as noted). Furthermore, each grating subassembly accounts for both polarities of light as noted. One portion of each grating subassembly may be configured to direct light of its associated wavelength and of a first polarity toward the second waveguide. Another portion of each grating subassembly may be configured to direct light of its associated wavelength and of a second, different polarity toward the second waveguide. These portions will typically be aligned in a direction in which a multiplexed or combined optical signal is progressing through the first waveguide. As such, a particular grating subassembly will be specific to a given wavelength, and will account for both polarities of this particular wavelength.

One way in which both polarities of light may be accounted for by each grating subassembly is by using a slightly different grating spacing within each grating subassembly. Consider the case where there are a plurality of grating subassemblies, and where each grating subassembly includes first and second grating sections that account for the first and second polarities of light, respectively. The grating spacing used in the first grating section of each grating subassembly may be within a range of about 0.1 to about 0.5 microns different from the grating spacing used in the second grating section of the same grating subassembly. Stated another way, the grating spacing used in the first and second grating sections of each grating subassembly differ by an amount that is of a range of 0.1 microns to about 0.5 microns. Adjacent grating subassemblies will have larger grating spacings to account for addressing different wavelengths of light. The grating spacings used by adjacent grating subassemblies will typically be at least about 1 micron different from each other.

A third aspect of the present invention generally relates to a method for making a demultiplexer. Multiple layers define a stack. "Overlying" is used in relation to this third aspect to identify that a particular layer within the stack is disposed at a higher elevation than one or more other layers. Being characterized as "overlying" should not be construed as meaning that there can be no intermediate layer. For instance, characterizing a first layer as being disposed in overlying relation to a second layer does not require that the first layer be disposed directly on top of the second layer, although it encompasses such a scenario. Moreover, the "overlying" characterization does not require that a particular layer overly the entirety of another layer.

The method of the third aspect generally includes forming a first waveguide layer in overlying relation to a first substrate, forming a barrier layer in overlying relation to the first waveguide layer, and forming a second waveguide layer in overlying relation to the barrier layer. Generally, the demultiplexer defined by the method of the third aspect includes a first demultiplexing subassembly in the form of a grating assembly on one side of the demultiplexer (e.g., one and typically a plurality of grating subassemblies), and a second demultiplexing subassembly in the form of a photodetector assembly on an opposite side thereof (e.g., one and typically a plurality of spaced photodetectors). In this regard, either the first or second demultiplexing assembly is formed at least in part by processing a surface of the second waveguide layer that projects away from the underlying barrier layer. Thereafter, the assembly formed thus far is inverted and mounted on a second substrate such that the demultiplexing assembly formed on the second waveguide layer projects at least generally toward the second substrate. A cap, protective layer, or the like first may be disposed over this particular demultiplexing assembly and/or for providing for a more desirable interface with the second substrate. In any case, the first substrate (which is now "on top") is then removed to expose a surface of the first waveguide layer that is opposite that which interfaces with the barrier layer. The other of the first and second demultiplexing subassemblies may then be formed at least in part by processing this surface of the first waveguide layer.

Various refinements exist of the features noted in relation to the third aspect of the present invention. Further features may also be incorporated in the third aspect of the present invention as well. These refinements and additional features may exist individually or in any combination. The formation of the first or second demultiplexing subassembly may entail forming an etch stop layer in overlying relation to the first substrate before forming the first waveguide layer. As such, the first waveguide layer would then be formed in overlying relation to both the etch stop layer and the first substrate. Removal of the first substrate could then be accomplished by mechanical polishing and chemical etching, with the etch stop layer being used to terminate the etching operation. The etch stop layer would thereafter be removed to allow for the processing to at least complete the definition of the first or second demultiplexing assembly directly on the first waveguide layer.

Each of the first waveguide layer, the barrier layer, and the second waveguide layer may be epitaxial. Representative ways in which the first waveguide layer, the barrier layer, and second waveguide layer may be formed include using molecular beam epitaxy, metal organic chemical vapor deposition, and liquid-phase epitaxy. One way in which the formation of the first waveguide layer, the barrier layer, and the second waveguide layer may be characterized is that no crystal regrowth need be utilized. Crystal regrowth may degrade the optical properties of the demultiplexer. Instead, the first waveguide layer, the barrier layer, and the second waveguide layer may each be entirely formed within the same processing chamber before ever having to remove this intermediate structure from the processing chamber for processing to complete the formation of the first and second demultiplexing subassemblies. Stated another way, no portion of either the first waveguide layer, the barrier layer, or the second waveguide layer is formed after the first and second demultiplexing subassemblies have been completely formed. Stated yet another way, all depositions that are used to define the first waveguide layer, the barrier layer, and the second waveguide layer are done without ever having to remove the substrate from a processing chamber for some intermediate processing. What is commonly characterized as "back side etching techniques" may be utilized in relation to the methodology of the third aspect for allowing processing on effectively opposite sides of the demultiplexer to at least assist in the formation of the first and second demultiplexing subassemblies.

Formation of the grating assembly may be done by etching in the third aspect. Preferably, a controlled or timed etch is utilized to define the grating assembly. Stated another way, the etching which may be used to form the grating assembly may be executed without using any type of an etch stop layer. Typically, the grating assembly will be in the form of a plurality of grating subassemblies that are spaced in the general direction in which a combined or multiplexed optical signal will travel through the first waveguide layer in the finished demultiplexer. Conventional semiconductor processing techniques may be used to form the photodetector assembly. Typically, the photodetector assembly will be in the form of a plurality of photodetectors that are also spaced in at least the general direction in which a combined or multiplexed optical signal will travel through the first waveguide layer in the finished demultiplexer. It should be appreciated that the method of the third aspect may be utilized to make the demultiplexers of the first aspect discussed above.

At least the initial portion of the formation of the photodetector assembly may be executed simultaneously with the formation of the first or second waveguide layer. That is, the same deposition process that may be employed to define the first or second waveguide layer may also be employed to define the photodetector assembly. In this regard, the photodetector assembly may define the entirety of the first or second waveguide layer. However, the formation of the photodetector assembly is not complete until after the deposition of the one or more layers which may define the first or second waveguide layer. That is, at least some processing is executed on an exposed surface of the first or second waveguide layer to complete the definition of the photodetector assembly. For instance, a patterning operation may be executed on this exposed surface to define a plurality of individual photodetectors that are spaced at least generally the direction in which the combined optical signal will travel through the demultiplexer that is made by the subject third aspect. Moreover, some processing on/through this surface will be required to establish electrical contact with the photodetector assembly.

A fourth aspect of the present invention relates to an optical switch that includes a pair of waveguides and at least one optically-induced grating of sorts for controlling which of these waveguides functions as the output channel for the optical signal that enters the optical switch. Generally, the optically-induced grating induces a spatially periodic change in the index of refraction in one of the waveguides to change the output channel from one of the waveguides to the other of the waveguides. Therefore, when the optically-induced grating is in a first mode, one of the waveguides is the output channel, while when the optically-induced grating is in a second mode, the other of the waveguides is the output channel.

Various refinements exist of the features noted in relation to the fourth aspect of the present invention. Further features may also be incorporated in the fourth aspect of the present invention as well. These refinements and additional features may exist individually or in any combination. In one embodiment, the optical switch of the fourth aspect includes first and second waveguides that may be viewed as being in a stacked configuration, with the first waveguide being disposed a higher elevation in the stack than the second waveguide. "Stacked" does not necessarily mean that the first waveguide is directly above the second waveguide or vice versa, although this typically will be the case.

What may be characterized as a barrier layer or index control channel may be and preferably is disposed between the first and second waveguides in the case of the fourth aspect. Selective coupling of the first and second waveguides effectively is the function of this barrier layer. Functionally, the barrier layer allows only certain light to pass from the first waveguide into the second waveguide when the optically-induced grating is in one of its two modes, and does not allow for any significant transmission of light through the barrier layer and into the second waveguide when the optically-induced grating is in its other mode.

Modification of the index of refraction in relation to the fourth aspect will be described in relation to an optical switch having first and second waveguides. An optical mask may be formed on an exposed external surface of the first waveguide, and at least one and more preferably a plurality of slits are formed in this optical mask. Multiple slits are preferably spaced in the direction in which light at least generally travels through the first waveguide. Preferably, the optical mask is opaque, although having limited transmissiveness may be tolerable in certain instances. Moreover, preferably each slit in the optical mask extends through the entire thickness of the optical mask to an exposed surface of the first waveguide, although retaining a certain amount of optical mask material at the bottom of each slit may be tolerable in certain instances. Stated another way, the optical mask has one degree of transparency, while the slits have a different, higher degree of transparency. In any case, a light source may be provided to project a control beam of sorts onto the optical mask in the area of the slit(s). The light source, the optical mask, and any slit formed in the optical mask may be characterized as being part of an optically-induced grating assembly.

Light from the light source that may be utilized by the fourth aspect may be directed toward the first waveguide to induce a general change the index of refraction of the first waveguide. This change in index of refraction provides the two modes for the optical switch associated with the fourth aspect, or more specifically for the optically-induced grating. In one embodiment: 1) when the light source is "off," the first waveguide and the second waveguide are optically "decoupled" and the optical signal will progress only through the first waveguide such that it is the output channel (i.e., the optical signal will not pass through any separation or barrier layer and into the second waveguide in this instance); and 2) when the light source is "on" such that light is directed onto the noted optical mask and into at least one of its slits and onto the first waveguide, the index of refraction of the first waveguide will be modified in such a manner such that the optical signal from the first waveguide will be able to pass through the barrier layer and into the second waveguide such that the second waveguide is the output channel in this instance. It may also be possible to "reverse" the foregoing in relation to which of the first and second waveguides is the output channel when the light source is on or off.

DETAILED DESCRIPTION OF THE INVENTION

The present invention will now be described in relation to the accompanying drawings which at least assist in illustrating its various pertinent features.

Demultiplexer Embodiment

Figure 1A:
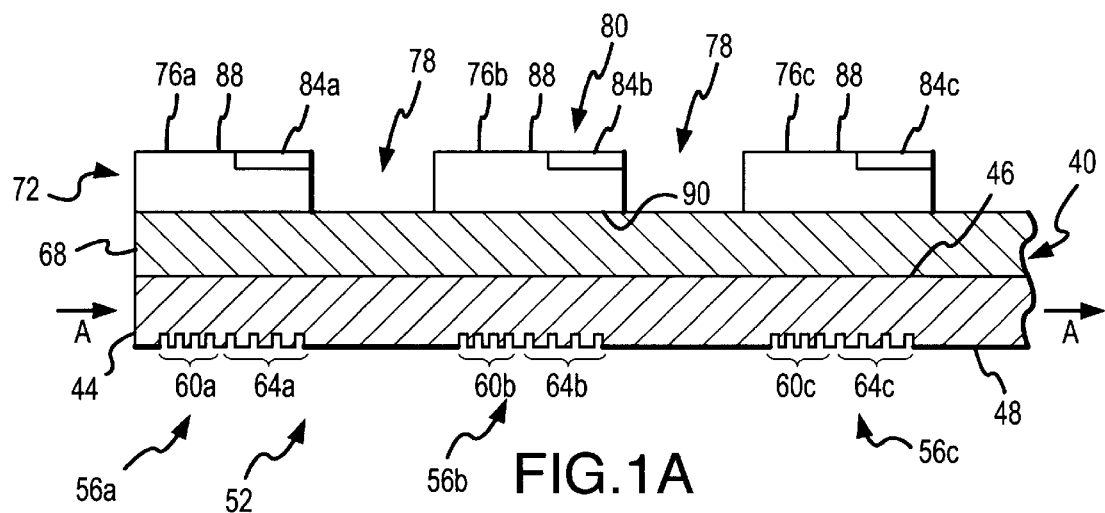
FIG. 1A is a cross-sectional view of one embodiment of a dual-side demultiplexer.
Figure 1B:
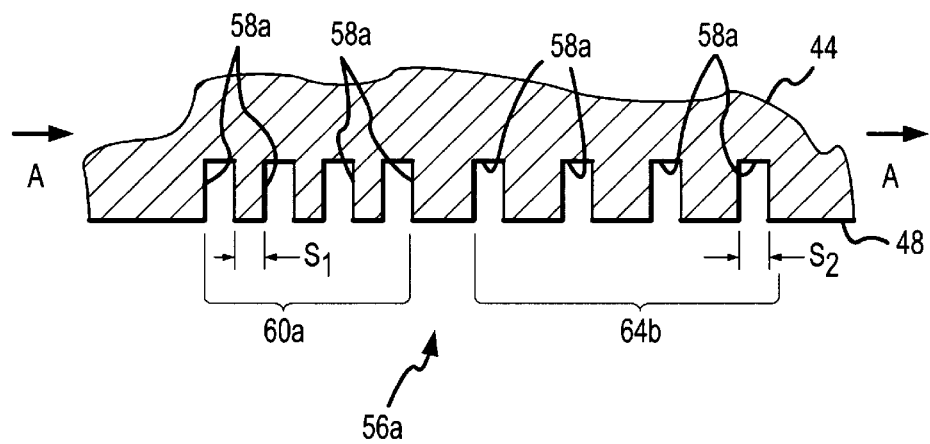
FIG. 1B is an enlarged, cross-sectional view of one of the gratings used by the demultiplexer of FIG. 1A.

One embodiment of a dual-side demultiplexer 40 is illustrated in FIGS. 1A–B. The demultiplexer 40 generally includes a first waveguide 44 through which a multiplexed or combined optical signal (e.g., a signal of a plurality of individual optical signals of particular wavelengths) generally travel through the first waveguide 44 in the direction of the arrow A. Hereafter, this combined or multiplexed optical signal will be discussed as including a plurality of wavelength-specific optical signals. Separation of this multiplexed optical signal into a plurality of individual optical signals is accomplished by a grating assembly 52 that is formed on a surface 48 of the first waveguide 44. These individual optical signals may be of a very specific wavelength or within a relatively narrow band of wavelengths that is on the order of 1–2 nanometers wide. In any case, these individual optical signals are directed to a second waveguide 72 which functions as an output channel for the plurality of individual optical signals. Control over which particular optical signal is able to pass from the first waveguide 44 to the second waveguide 72 is provided by an index control channel or barrier layer 68. Individual optical signals that are able to pass through the barrier layer 68 and into the second waveguide 72 are "read out" by a photodetector assembly 80 that is formed on a surface 88 of the second waveguide 72.

The first waveguide 44 again is an optical conduit or confinement for a multiplexed or combined optical signal, and includes the grating assembly 52 that is formed on its surface 48. Surface 48 of the first waveguide 44 is opposite that of a surface 46 of the first waveguide 44 that interfaces with the barrier layer 68. The grating assembly 52 generally includes a plurality of gratings 56 that are spaced in the general direction in which the multiplexed optical signal travels through the first waveguide 44 that is represented by the arrow A in FIGS. 1A–B. Although only three gratings 56 are illustrated in FIG. 1A, it should be appreciated that any number of gratings 56 may be utilized. In one embodiment, the demultiplexer 40 includes about 64 gratings 56. One key feature of the grating assembly 52 is that the gratings 56 are reflective versus transmissive. Using a reflective grating versus a transmissive grating allows the demultiplexer 40 to have reduced power demands, as well as allowing for the manufacture of the demultiplexer 40 using back-side processing techniques versus crystal regrowth. Generally, the combination of material indices of refraction for the first waveguide 44, second waveguide 72, barrier layer 68, and the grating assembly 52, as well as the period and pitch of the gratings 56 of the grating assembly 52, determines if the grating assembly 52 is reflective or transmissive.

Each grating 56 is associated with light of a specific wavelength. That is, each grating separates light of a specific wavelength (or a small bandwidth, such as on the order of a 1–2 nm as noted above) from the multiplexed optical signal that is traveling through the first waveguide 44. Multiple slots 58 are formed in the surface 48 of the first waveguide 44 and extend across the entire lateral extent thereof to define each particular grating 56 and to provide the wavelength-based separation function. Any number of slots 58 may be used to define each grating 56.

Another advantage of the grating assembly 52 is that both polarities of light are accounted for by each of its gratings 56. In this regard, each grating 56 includes a plurality of slots 58 that utilize a first grating spacing that is designated as $S_1$ in FIG. 1B, as well as a plurality of slots 58 that utilize a second grating spacing that is designated as $S_2$ in FIG. 1B. Both the first and second grating spacing $S_1$ and $S_2$ are measured in the direction in which a multiplexed optical signal travels through the first waveguide 44. The slots 58 that utilize the first grating spacing $S_1$ define a first grating section 60 in the particular grating 56, while the slots 58 that utilize the second grating spacing $S_2$ define a second grating section 64. Generally, the first grating section 60 in each grating 56 will separate light of a given wavelength (or bandwidth) and a first polarity from the multiplexed optical signal, while the second grating section 64 in each grating 56 will separate light of the same wavelength as its corresponding first grating section 60 (or the same bandwidth), but at a second polarity. Consider the case where the grating 60a separates light of a first wavelength from the multiplexed optical signal that is being transmitted through the first waveguide 44. The first grating section 60a will separate out the light of the first wavelength and the first polarity from the multiplexed optical signal, while the second grating section 64a will separate out the light of the first wavelength and the second polarity from the multiplexed optical signal.

There is a difference in the magnitude between the first grating spacing $S_1$ and the second grating spacing $S_2$ in each grating 56 of the grating assembly 52. In one embodiment, the difference in magnitude between the first grating spacing $S_1$ and the second grating spacing $S_2$ in each grating 56 is within a range of about 0.1 microns to about 0.5 microns. This relatively small difference in the grating spacing allows a given grating 56 to separate out both polarities of light at the same wavelength. Larger changes in the grating spacing provides for separation of light of a different wavelength from the multiplexed optical signal. In one embodiment, there is at least about a 1 micron difference in the grating spacing used by adjacent gratings 56 in the demultiplexer 40. For instance, the difference between the smallest of the first and second grating spacings $S_1$ and $S_2$ in one of the gratings 56 and the smallest of the first and second grating spacings $S_1$ and $S_2$ in an adjacent grating 56 will be at least about 1 micron such that these gratings will separate out different wavelengths of light from the multiplexed optical signal.

Each of the first grating sections 60 of each of the gratings 56 may be for separating light of the same polarity (albeit at different wavelengths). That is, the grating assembly 52 may be configured such that each first grating section 60 separates out light of the same polarity, and further such that each second grating section 64 separates out light of the same polarity. However, this need not be the case. For instance, the first grating section 60a of the grating 56a may be configured for separating light of a first wavelength and the first polarity, the second grating section 64a of the grating 56a may be configured for separating light of the first wavelength and the second polarity, the first grating section 60b of the grating 56b may be configured for separating light of a second wavelength and the second polarity, and the second grating section 64b of the grating 56b may be configured for separating light of the second wavelength and the first polarity.

Only light that has been reflected by one of the gratings 56 is able to pass through the barrier layer 68 to the corresponding portion of the second waveguide 72. That is, the grating assembly 52 not only separates light of the particular wavelength from a multiplexed optical signal, but also effectively "conditions" the optical signal of this particular wavelength in such a manner that the first waveguide 54 and a corresponding portion of the second waveguide 72 become coupled. Light that is transmitted into the second waveguide 72 is directed out of the second waveguide 72 by a photodetector assembly 80. Generally, optical signals that progress into the second waveguide 72 are captured and detected by the photodetector assembly 82, with the resulting electrical signals being further processed by appropriate signal processing/readout componentry (not shown).

The second waveguide 72 effectively defines a plurality of output channels for the plurality of individual optical signals which are separated out from the multiplexed optical signal by the grating assembly 52 that is associated with the first waveguide 44. This is most easily implemented in the demultiplexer 40 by having the second waveguide 72 actually be a plurality of second waveguide sections 76 that are spaced in the direction in which the multiplexed optical signal travels through the first waveguide 44. That is, adjacent second waveguide sections 76 are separated by a space 78. Each second waveguide section 76 is associated with a single grating 56 of the first waveguide 44, and each second waveguide section 76 includes at least one photodetector 84 of the photodetector assembly 80. Any appropriate structure may be used for the various photodetectors 84 (including a PIN photodiode), although the various photodetectors 84 are preferably integrally formed in the second waveguide 72. Light of a particular wavelength is thereby reflected by a given grating 56, passes through the barrier layer 68 and into the corresponding second waveguide section 76, is transmitted through this particular second waveguide section 76, and is output from the particular second waveguide section 76 through its associated photodetector(s) 84. Other applications of the structure of the demultiplexer 40 may allow/benefit from the second waveguide 72 being of a continuous nature. However, this is not believed to be appropriate or particularly functional for the subject demultiplexing application.

Figure 1C:
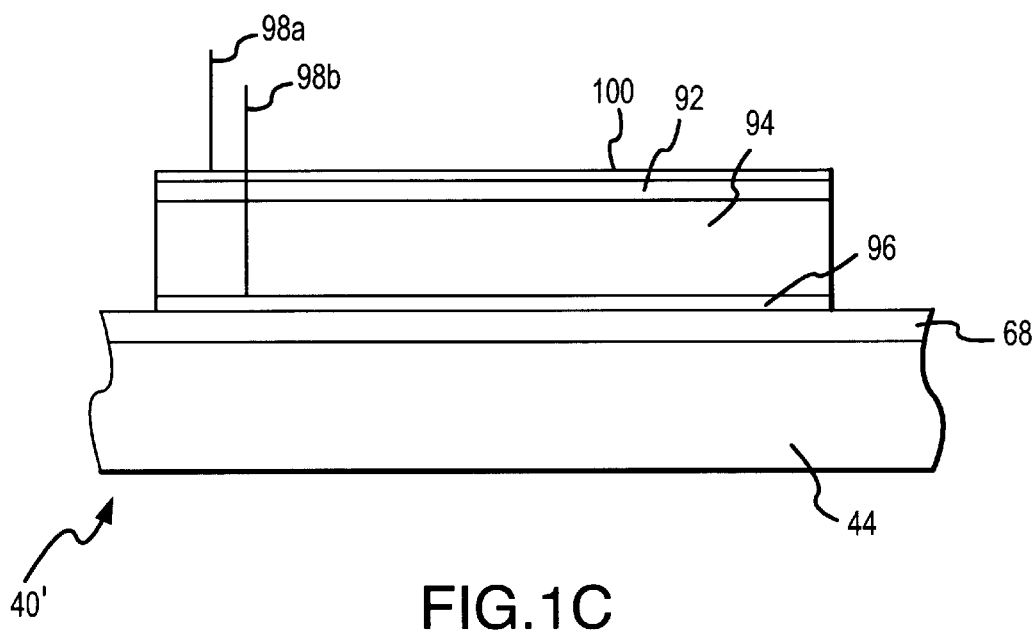
FIG. 1C is a side view of another embodiment of a dual-side demultiplexer.
Figure 1D:
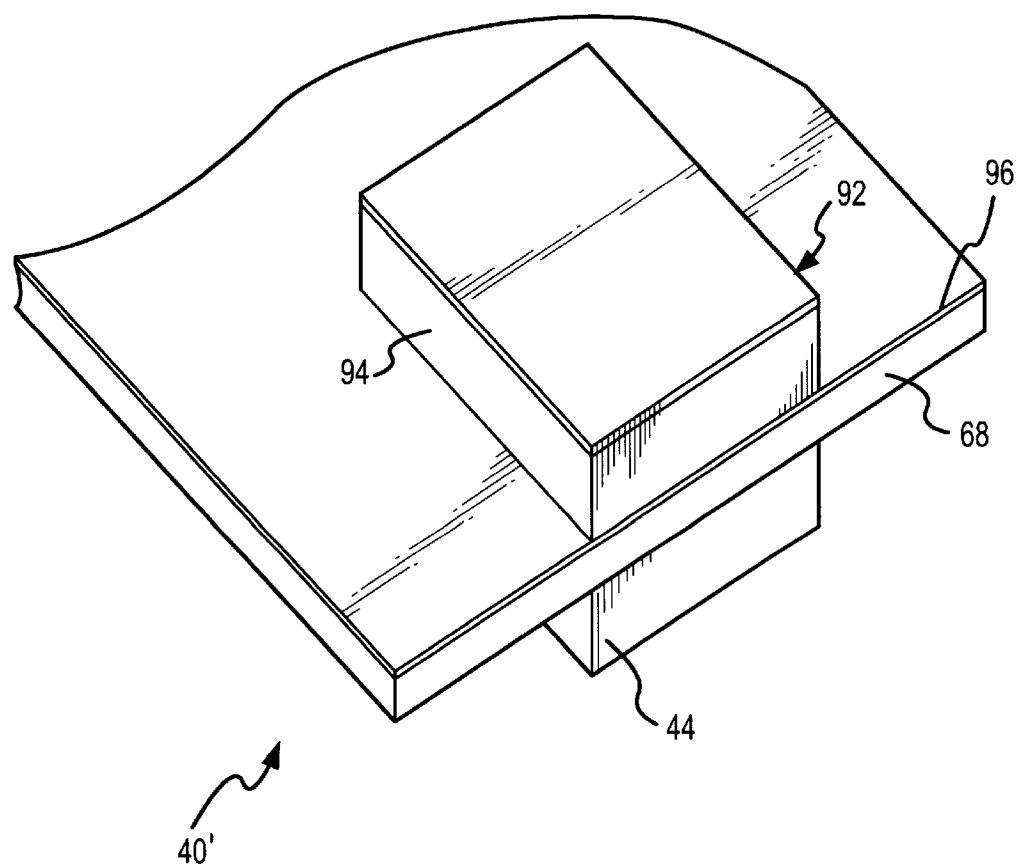
FIG. 1D is a perspective view of the demultiplexer presented in FIG. 1C.

FIG. 1A illustrates that each other photodetectors 84 is part of its corresponding second waveguide section 76. That is, a given photodetector 84 is smaller than its corresponding second waveguide section 76. In another embodiment, these two structures may be combined into a single structure which is illustrated in FIGS. 1C–D. Corresponding components between the embodiment of FIGS. 1A–B and FIGS. 1C–D are similarly identified, although a "single prime" designation is used to denote those components which differ in at least some respect. The demultiplexer 40' includes the above-described first waveguide 44 and its corresponding grating assembly 52 (not shown in FIGS. 1C–D), as well as the above-described a barrier layer 68. The primary distinction between the demultiplexer 40' of FIGS. 1C–D and the demultiplexer 40 of FIGS. 1A–B is that each photodetector 84' and its corresponding second waveguide section 76 in the case of the demultiplexer 40' of FIGS. 1C–D are defined by the same structure, whereas in the case of the demultiplexer 40 of FIGS. 1A–B each photodetector 84 is illustrated and described as being formed in only part of its corresponding second waveguide section 76'.

Each photodetector 84' includes a p$^+$ layer 92 and an n$^+$ layer 96 that are separated by an intrinsic layer 94. A metal contact layer 100 may be formed on the p$^+$ layer 92. An electrical contact 98$a$ is electrically interconnected with this metal contact layer 100 and thereby the p$^+$ layer 92. An electrical contact 98$b$ is also electrically interconnected with the n$^+$ layer 96, either directly or through a metal contact layer (not shown). Generally, an optical signal that is coupled with a particular second waveguide section 76'/photodetector 84' is absorbed by the material that defines its corresponding intrinsic layer 94. This absorption creates photogenerated carriers. Application of an external electric field across the intrinsic layer 94 by applying a voltage to the n$^+$ layer 96 via its corresponding electrical contact 98$b$, and by applying a voltage to the p$^+$ layer 92 via its electrical contact 98$a$, allows these photogenerated carriers to be swept out of the intrinsic region 94 and collected by the electrical contacts 98$a$ and 98$b$.

In summary, the first waveguide 44 and second waveguide 72 of the demultiplexer 40 are preferably normally asynchronous (i.e., not coupled). One may view the grating assembly 52 as placing the first waveguide 44 and second waveguide 72 in selective synchronous relation, namely in relation to those individual wavelengths of light that are reflected by a particular grating 56 and that are then able to pass through the barrier layer 68.

Various factors may have an effect on the performance of the demultiplexer 40. The first waveguide 44 and the second waveguide 72 preferably have different indices of refraction and are of different thicknesses such that the demultiplexer 40 is strongly asymmetric and further such that the first waveguide 44 and second waveguide 72 are preferably normally asynchronous as noted. The barrier layer 68 is preferably sufficiently thick so that the first waveguide 44 and the second waveguide 72 are normally "uncoupled" (e.g., such that only light that is reflected by the grating assembly 52 is allowed to pass from the first waveguide 44 to the second waveguide 72), since the natural coupling between the first waveguide 44 and the second waveguide 72 is preferably relatively small. Moreover, preferably the depth of the slots 58 of each grating 56 is relatively shallow or small so that the grating assembly 52 does not significantly change the distribution of the transverse E-field of the waveguides 44, 72 in their unperturbed condition.

Generally, the above-described demultiplexer 40 may be used to demultiplex an optical signal having any number of different wavelengths or across any wavelength range. All that is required is that each grating 56 be designed to "retrieve" the desired wavelength. Moreover, certain changes in the design of the first waveguide 44 and/or the second waveguide 70 may be required to accommodate a given optical signal to be demultiplexed. It should also be appreciated that it may be possible to reverse the operation of the demultiplexer 40 to provide a multiplexing function instead of the described demultiplexing function.

Figure 1E:
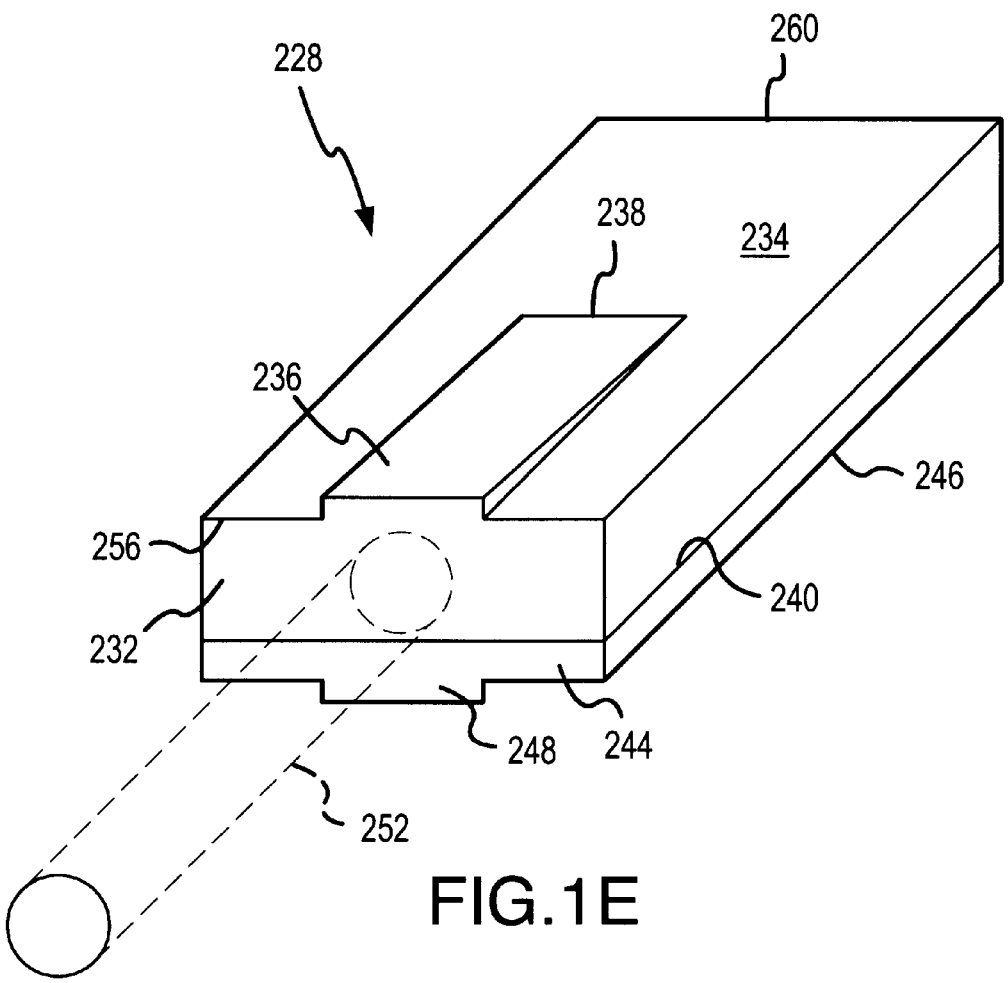
FIG. 1E is a perspective view of one embodiment of an input section or adapter for introducing light into a waveguide.

One embodiment of a structure for establishing an optical coupling with the above-discussed first waveguide 44 of the demultiplexer 40 is illustrated in FIG. 1E in the form of an optical coupler 228. Although the optical coupler 228 will be described in relation to providing optical input to the first waveguide 44 of the demultiplexer 40, it should be appreciated that the coupler 228 may be used to provide optical input to any appropriate waveguide. The optical coupler 228 may be simultaneously formed with any waveguide for which it is providing optical input, or it may be separately formed and appropriately attached to or integrated with such a waveguide.

The optical coupler 228 includes an input end 256 and an output end 260. The input end 256 at least operatively interfaces with an optical fiber 252 that is shown in dashed lines for clarity in relation to the coupler 228 (the fiber 252 and input end 256 are preferably disposed in abutting relation, although it may be possible to have the same disposed in spaced relation), while the output end 260 at least operatively interfaces with the first waveguide 44 (the output end 260 and the first waveguide 44 are preferably disposed in abutting relation, and more preferably are integrally formed, although it may be possible to have the same disposed in spaced relation). Multiple regions are provided for the optical coupler 228 to enhance the optical coupling between the fiber 252 and the first waveguide 44. In this regard, the optical coupler 228 includes a first region 232 and a second region 244 which are vertically stacked and optically separated or de-coupled by an appropriate barrier 240. A first optical guide 236 in the form of a wedge is disposed on an outer surface 234 of the first region 232, while a second optical guide 248 in the form of a rib is disposed on an outer surface 246 of the second region 244. The first optical guide 236 extends only part of the way from the input end 256 to the output end 260, while the second optical guide 248 extends the entire length of the optical coupler 228. Generally, the first optical guide 236 functions to optically couple the first region 232 with the second region 244, while the second optical guide 248 functions to confine this light and acts as an optical conduit (e.g., waveguide).

The optical fiber 252 directs light into the upper region 232 of the optical coupler 228. The first optical guide 236 directs this light from the first region 232 through the barrier 240 and into the second region 244 (i.e., optically couples the regions 232, 244), and the second optical guide 248 thereafter confines this light. Light that has entered the second optical region 244 and that has progressed beyond the distal end 238 of the first optical guide 236 is thereafter sufficiently retained in the second region 244 by the second optical guide 248 and may then be directed into the first waveguide 44. As noted, in a preferred embodiment, the optical coupler 228 and the demultiplexer 44 (or any appropriate optical structure that may be used with the optical coupler 228) are integrally formed. Therefore, one could actually characterize the second optical guide 248 as the first waveguide 44 of the demultiplexer 40 (or the waveguide of the structure that is using the coupler 228).

Generally, the optical coupler 228 provides a first region 232 of an enhanced thickness or vertical extent to provide a profile on the input end 256 of the coupler 228 that more closely approximates the circular output of a round optical fiber 252. That is, the aspect ratio at the input end 256 is reduced and is believed to allow for losses on the order of 1 dB or less. The tapering down provided by the first optical guide 236 results in the second region 244/second optical guide 248 having a high aspect ratio, which thereby allows the first waveguide 44 to have a similarly high aspect ratio for function.

Figure 2:
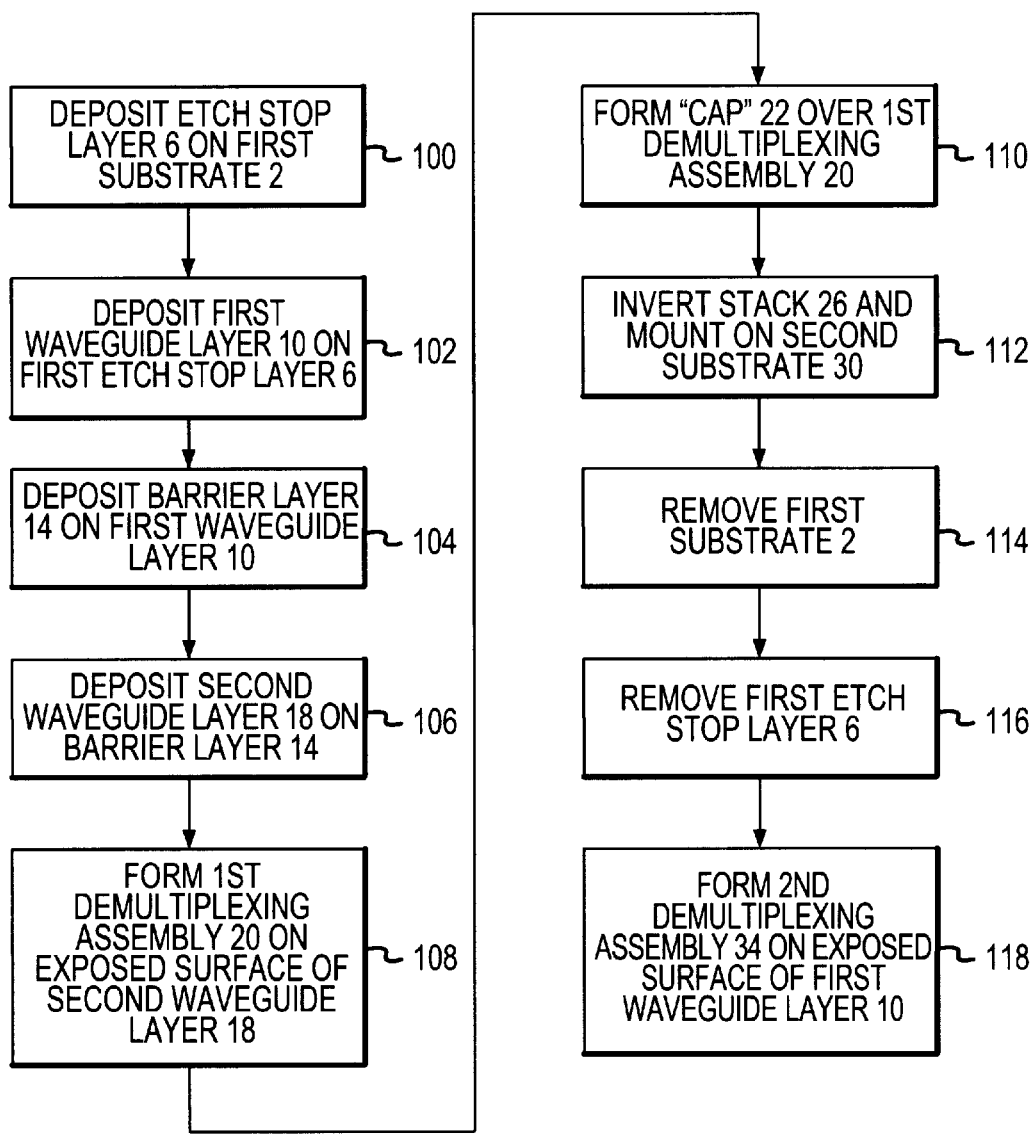
FIG. 2 is a flowchart of one embodiment of a method which may be used to make the dual-side demultiplexer of FIGS. 1A–B.
Figure 3A:
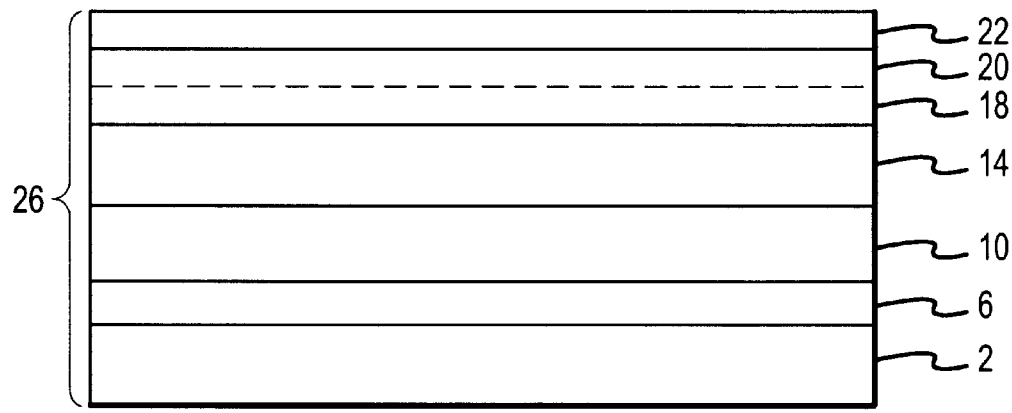
FIG. 3A is a cutaway, side view of an intermediate structure produced by the methodology of FIG. 2.
Figure 3B:
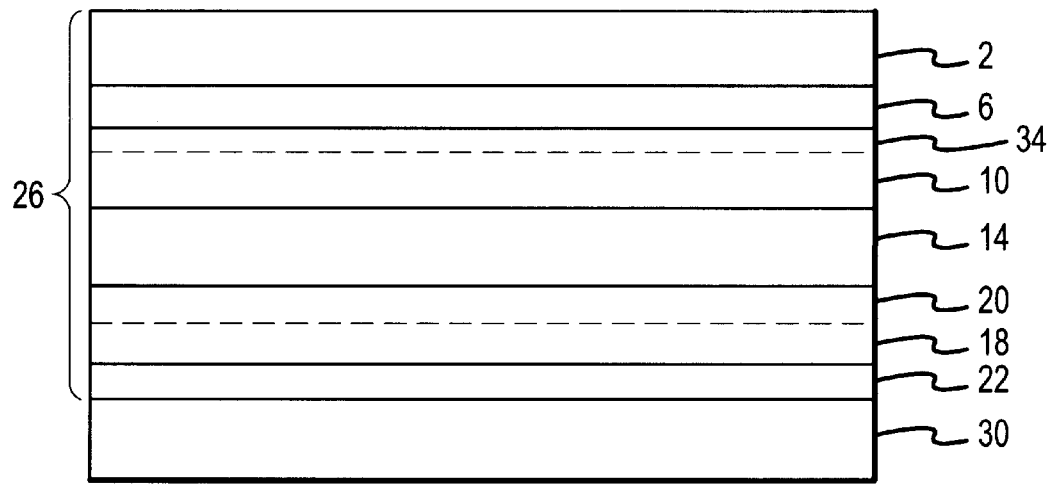
FIG. 3B is a cutaway, side view of a subsequent, intermediate structure produced by the methodology of FIG. 2.

One method that may be used to make the dual-sided demultiplexer 40 of FIGS. 1A–B is presented in FIG. 2, and intermediate structures that are formed by this method are illustrated in FIGS. 3A–B. It should be appreciated that this same general methodology is equally applicable/adaptable to forming the demultiplexer 40' of FIGS. 1C–D as well, although the methodology will only be described in relation to the demultiplexer 40. All of the various layers used by the demultiplexer 40 are formed in their entirety before any processing is done to at least complete the definition of either of the grating assembly 52 or the photodetector assembly 80. None of the layers of the demultiplexer 40 need to nor do they undergo any crystal regrowth to realize the configuration presented in FIG. 1A.

The initial portion of the method of FIG. 2 will be discussed in relation to FIG. 3A. Step 100 indicates that an etch stop layer 6 is formed on a first substrate 2. This etch stop layer 6 allows for removal of the first substrate 2 as will be discussed in more detail below. A first waveguide layer 10 is then formed on the first etch stop layer 6 as indicated by step 102. This first waveguide layer 10 may define either the first waveguide 44 or the second waveguide 72. A barrier layer 14 is then formed on the first waveguide layer 10 as indicated by step 104, and a second waveguide layer 18 is then formed on the barrier layer 14 as indicated by step 106. Steps 100–106 will typically be performed in a single processing chamber and without having to remove the substrate 2 and any layers formed thereon for some "intermediate" processing. That is, none of the layers 6, 10, 14, or 18 include any crystal regrowth. Any way for forming the etch stop layer 6, the first waveguide layer 10, the barrier layer 14, and the second waveguide layer 18 may be utilized, including molecular beam epitaxy, metal organic chemical vapor deposition, and liquid phase epitaxy.

Following the formation of the etch stop layer 6, the first waveguide layer 10, the barrier layer 14, and the second waveguide layer 18, a first demultiplexing assembly 20 is formed at least in part by processing the exposed surface of the second waveguide layer 18 (i.e., that surface of the second waveguide layer 18 that is opposite that which interfaces with the barrier layer 14). That is, a portion of the first demultiplexing assembly 20 could be simultaneously defined by the formation of the second waveguide layer 18, for instance if the first demultiplexing assembly 20 were to be the photodetector assembly 80 (e.g., the depositions used to define the second waveguide layer 18 could also define one or more materials that will ultimately define the photodetector assembly 80). This first demultiplexing assembly 20 may be either the grating assembly 52 or the photodetector assembly 80 of the demultiplexer 40 of FIGS. 1A–B. In the case where the first demultiplexing assembly 20 is the photodetector assembly 80, this processing of the exposed surface of the second waveguide layer 18 could include patterning the second waveguide layer 18 to define a plurality of spaced photodetectors 84, providing for electrical contact with the photodetector assembly 80, or both. As noted above, each photodetector 84 may define the entirety of its associated second waveguide section 76. In any case, thereafter an appropriate protective layer or cap 22 may be formed over the exposed surface of the second waveguide layer 18 and its first demultiplexing assembly 20 as indicated by step 110 of the methodology of FIG. 2. The structure formed thus far in the methodology of FIG. 2 may be characterized as a stack 26.

The second waveguide layer 18 must be processed to define the desired waveguide therefrom or so as to provide for lateral confinement of an optical signal traveling therethrough. In this regard, the stack 26 could be patterned to define a pair of at least generally laterally spaced and at least generally longitudinally extending grooves to define a waveguide therefrom. Another option would be to define the waveguide from the second waveguide layer 18 in this generally manner before formation of the first demultiplexing assembly 20 in the above-noted manner.

The stack 26 is then inverted and mounted on a second substrate 30 as indicated by step 114 of the methodology of FIG. 2. This inverted condition is illustrated in FIG. 3B. Both the first substrate 2 and the etch stop layer 6 are then removed as indicated by steps 114 and 116 so as to now expose the first waveguide layer 10. This surface of the first waveguide layer 10 is that surface which is opposite the surface of the first waveguide layer 10 that interfaces with the barrier layer 14. Thereafter, a second demultiplexing assembly 34 may be formed at least in part by processing this exposed surface of the first waveguide layer 10. The second demultiplexing assembly 34 may be either the grating assembly 52 or the photodetector assembly 80. That is, either the formation of the grating assembly 52 or the photodetector assembly 80 will at least be completed in step 108 of the methodology of FIG. 2, and the formation of the other of the grating assembly 52 or the photodetector assembly 80 will at least be completed in step 118 of the methodology of FIG. 2.

The first waveguide layer 10 also must be processed to define the desired waveguide therefrom or so as to provide for lateral confinement of an optical signal traveling therethrough. In this regard, the first waveguide layer 10 may be patterned to define a pair of at least generally laterally spaced and at least generally longitudinally extending grooves to define a waveguide therefrom. This may be done before or after the formation of the second demultiplexing assembly 34 in the above-noted manner.

There are certain advantages with having the first demultiplexing assembly 20 in the methodology of FIG. 2 be the grating assembly 52 of the demultiplexer 40. That is, there are certain advantages with forming the grating assembly 52 before forming the photodetector assembly 80. One is a cost issue. There is more processing involved with the formation of the grating assembly 52 versus the photodetector assembly 80 and/or errors are more likely to be encountered in the processing of the grating assembly 52 versus the photodetector assembly 80. Therefore, it may be more cost effective from an overall production standpoint to have the first demultiplexing assembly 20 in the method of FIG. 2 be the grating assembly 52. Another is an ease with which the relevant electrical interconnections can be made with the photodetector assembly 80 since the same would then be on an exposed surface. That is, the second substrate 30 would typically remain as part of the demultiplexer (not shown in FIGS. 1A–B).

There are also certain advantages with having the first demultiplexing assembly 20 in the methodology of FIG. 2 be the photodetector assembly 80 of the demultiplexer 40. Before step 118 of the methodology of FIG. 2 is executed, the stack 26 should be properly aligned (e.g., using any appropriate back-side alignment technique). This alignment may be more accurate and/or easier to do if the first demultiplexing subassembly 20 is not the grating assembly 52. At least some back-side alignment techniques are optical-based. If the grating assembly 52 is formed before the photodetector assembly 80, the gratings 56 may distort the optics being used for this alignment.

Theoretical Analysis—Demultiplexer Embodiment

The device in accordance with the present invention described herein separates closely spaced wavelength multiplexed optical signals into different waveguide channels. This device is created using two optical waveguides stacked one above the other fabricated on opposing sides of the material. The first waveguide is a channel for the combined (multiplexed) optical signals, and the second waveguide is the output channel for individual wavelengths of the set. A particular wavelength is coupled out of the first waveguide into the second waveguide segment through the use of a diffraction grating fabricated onto a segment of the surface of the first waveguide. A key feature of this device is the use of a reflective diffraction grating used with two-sided material processing. This allows the creation of the device without the use of crystal regrowth, a difficult material-processing step that is used in many other demultiplexer devices. Most other methods of performing the demultiplexing function for optical data divide all N wavelengths among N separate detection channels. The $M^{th}$ signal channel then rejects the other N–1 wavelengths in its channel and detects only the $M^{th}$ wavelength. Thus (N–1)/N portion of the original signal is rejected. In the device in accordance with the present invention, no signal is rejected in the filtering process; thus greatly reducing the power demands at the system level. Also, the design in accordance with the present invention has the additional feature of easy integration of a set of semiconductor detectors onto each separate channel. This allows for a more efficient and compact design.

Figure 4:
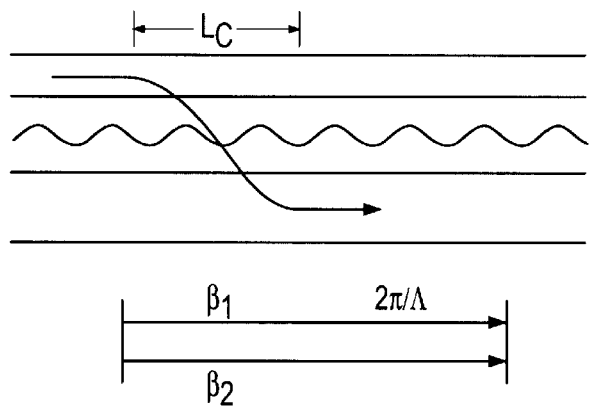
FIG. 4 is a schematic of a grating-assisted, co-directional coupler of the transmissive type and that is in the prior art.

The basic idea for the demultiplexer of the present invention is to use the grating-assisted co-directional coupler (GACC) structure to redirect the optical signals of different wavelengths into a second waveguide, in combination with a reflective grating. For contrast, a schematic view of a transmissive version of a GACC in the prior art is illustrated in FIG. 4. In this asymmetric dual-waveguide prior art structure, the two waveguide modes propagate with distinct propagation constants $\beta_1$ and $\beta_2$.

In general, optical power can couple between two closely spaced waveguides. This coupling can be complete when the two modes have same propagation constants; in this case, the light propagates along each waveguide with their waves synchronized in the two guides. However, if the modes have different propagation constants (asynchronous case), the natural coupling between the two waveguides is incomplete and can be extremely weak. Complete power exchange can be achieved with the assistance of periodic structure perturbation such as grating, even if the two waveguides are extremely asymmetric. The period $\Lambda$ of the grating should be chosen to satisfy the phase-match condition at desired coupling wavelength $\lambda_0$: $\beta_1-\beta_2=2\pi/\Lambda$. The transmissive-version of a GACC that is in the prior art suffers from the requirement to process the intermediate layers, between the two waveguides. This requires a post-processing deposition to form the second waveguide structure. The present invention does not require this difficult and unreliable processing step.

Figure 5:
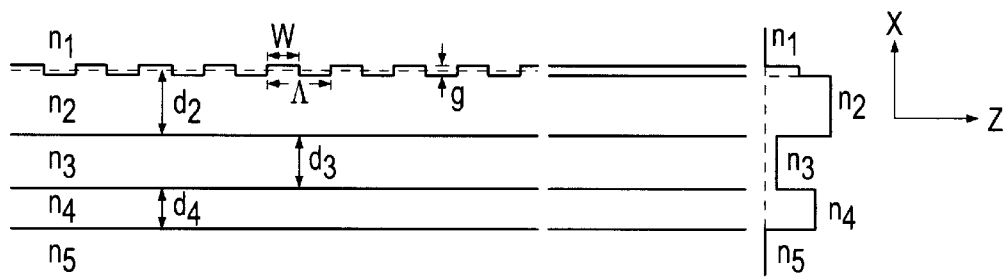
FIG. 5 is a schematic of an embodiment of a grating-assisted, co-directional coupler of the reflective type in accordance with one or more principles of the present invention.

A reflective version of a GACC-filter structure and in accordance with one or more principles of the present invention is shown in FIG. 5. The light can be guided in the layer that have indices of refraction $n_2$ and $n_4$, which are larger than the indices of refraction in the other layers. These two layers are designed to have different refractive index and thickness so that the structure is strongly asymmetric and the two waveguides are asynchronous. Layer $n_3$ is the separation layer, and this cannot be thin because we design the natural coupling between the two waveguides to be negligibly small. The grating layer is shallow compared to the other layers so that the presence of the grating does not significantly change the distribution of the transverse E-field of the unperturbed waveguides.

The compound waveguide even without the coupling grating contains at least 6 dielectric layers and it is difficult to determine the exact expressions for the compound modes. When $g<<d_2$, the effect of the grating on the effective thickness of the guiding layer is small, and the entire structure without the grating is approximated to a 5-layer waveguide structure. For this simple 5-layer structure, the eigenvalue equation and the analytical forms of the compound modes are not too complicated and they can be used to calculate the phase-matching grating period and the coupling coefficient. For more accurate results, the multilayer waveguide modes are solved. To do this, a matrix approach is used to obtain the propagation constants of the compound modes. However, for the more practical 7-layer structure shown in FIG. 6 and which is also in accordance with one or more principles of the present invention, the compound modes are found by solving the wave equations in each layer and require the guided modes to satisfy the various boundary conditions. This results in a system of twelve homogenous equations where the non-zero solutions exist only if the determinant of the system equals zero. This can be determined numerically and then the amplitude coefficients can be determined by solving the linear equations system.

Figure 7:
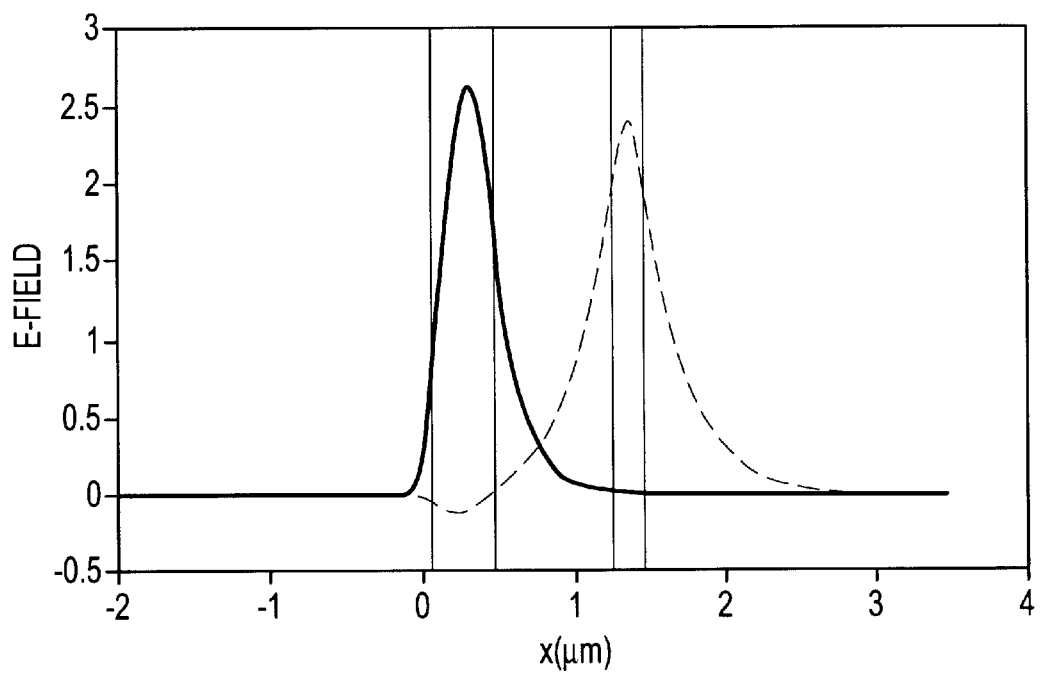
FIG. 7 is a graph illustrating optical modes for a grating-assisted, co-directional coupler of the reflective type in accordance with one or more principles of the present invention.

For the entire unperturbed structure, which is strongly asymmetric, the two compound modes are shown in FIG. 7 (optical modes for the coupled waveguide structure): even (symmetric) mode and odd (anti-symmetric) mode. They are mostly confined in one of the guiding layers respectively. The total electric field of the entire perturbed structure can be expanded as in terms of these orthogonal modes.

The light is initially in the first guide ($A_1(0)=1$, $A_2(0)=0$) setting up a simple set of initial conditions, and using the coupled waveguide theory the coupling efficiency can be determined to be:

$$\Gamma = \left|\frac{A_2(L)}{A_1(0)}\right|^2 = |A_2(L_c)|^2 = \frac{\kappa^*\kappa}{2}\sin^2(sL_c) = \frac{\kappa^*\kappa}{\kappa^*\kappa + \left(\frac{\delta}{2}\right)^2}\sin^2\left(\sqrt{\kappa^*\kappa + \left(\frac{\delta}{2}\right)^2} \cdot L_c\right)$$

and to maximize the coupling from waveguide one into waveguide two, the coupling length $L_c$ must satisfy $$\sqrt{\kappa^*\kappa + \left(\frac{\delta}{2}\right)^2} \cdot L_c = \frac{\pi}{2} \qquad 5$$

When $\delta=0$, the phase-matching condition $\beta_1-\beta_2=2\pi/\Lambda$ is met and the coupling efficiency is $\Gamma=1$. This is used to determine the grating period for the specified center wavelength $\lambda_c$. Then the coupling length is calculated using $L_c=\pi/2|\kappa|$ in the second equation. Here $\kappa$, the coupling coefficient, is a function of the wavelength. The grating period, $\Lambda$, and the coupling length, $L_c$, are the two most important parameters in designing this GACC device in accordance with the present invention. Once these parameters are fixed, $\Gamma$ decreases rapidly when the wavelength of the input light is detuned from the $\lambda_c$ since the phase mismatch of the two waveguide modes causes the destructive interference. This property of strong wavelength selection is used to make the narrow-band GACC filters, which are used to create the wavelength demultiplexer of the present invention.

Figure 6:
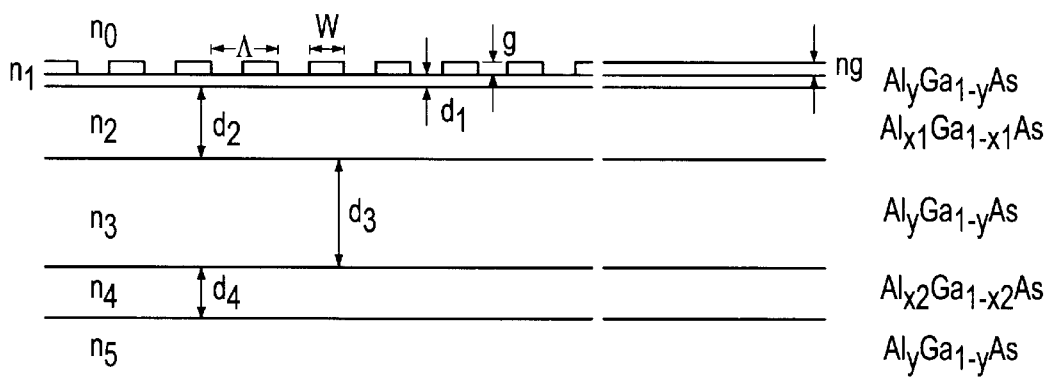
FIG. 6 is a schematic of an embodiment of a grating-assisted, co-directional coupler of the reflective type in accordance with one or more principles of the present invention.

Usually there are two constraints for this filter structure: fixed coupling length or fixed channel FWHM (full width at half maximum). To create a 2-nm channel spacing for the demultiplexer, the FWHM of each channel is at most 2 nm, and a narrower FWHM will reduce the crosstalk between the channels. As an example, a structure made of GaAs and $Al_xGa_{1-x}As$ is analyzed. This material system is easily grown to the required tolerances using either molecular beam epitaxy (MBE) or metal-organic chemical vapor deposition (MOCVD). The structure in FIG. 6 is used to determine the design curves for this device. The index of refraction of $Al_xGa_{1-x}As$ is obtained from the empirical formula, and the dependence of the refractive index on the wavelength of the incident light is included in the calculation.

The band-gap energy $E_g$ of $Al_xGa_{1-x}As$ is 1.424+1.247x eV for 0<x<0.45. Because this passive device will be operated at the wavelength near 850 nm (1.462 eV) and $E_g$ should be well above this transmission window to reduce the absorption loss, the composition x of Al of each layer is greater than 0.1, which corresponding $\lambda_g$=803 nm. In this case, x=0.40 for the cladding layers and separation layers, x=0.15 for the upper waveguide and x=0.22 for the lower waveguide.

Figure 8:
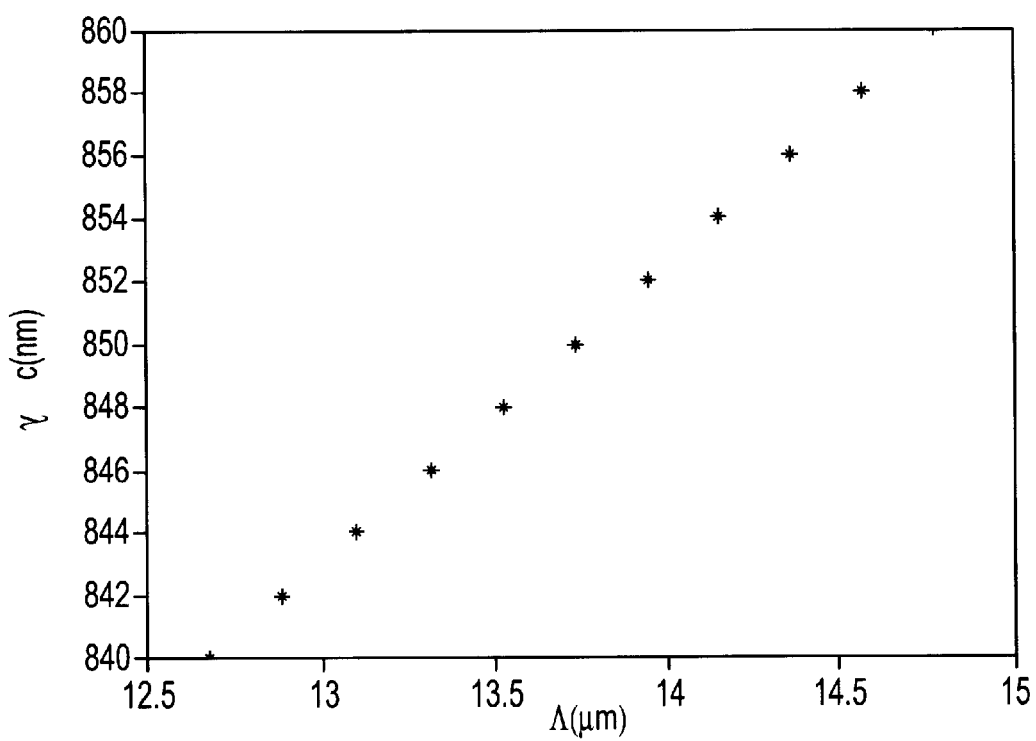
FIG. 8 is a plot of the grating period versus center wavelength of the filter channel of a grating-assisted, co-directional coupler of the reflective type in accordance with one or more principles of the present invention.

The center wavelength $\lambda_c$ of the filter channel is nearly linear to the grating period $\Lambda$, shown in FIG. 8. This property is used as the basic principle of the GACC demultiplexer in accordance with one or more principles of the present invention. To get narrow channel spacing, the difference of the grating period $\Lambda$ should be small. To minimize the effect of the fabrication errors of the grating, we require that the slope $\Delta\Lambda/\Delta\lambda_c$ can not be so small that the slight difference of the period to get desired channel spacing is close to the fabrication tolerance of the grating. The dependence of $\Delta\Lambda/\Delta\lambda_c$ on the device parameters is plotted in the following figures. The typical value for $\Delta\Lambda/\Delta\lambda_c$ is 0.1 $\mu$m/nm.

The FWHM bandwidth of the GACC filter used by/in accordance with one or more principles of the present invention follows $$\Delta\lambda \approx 0.8 \frac{\lambda_c^2}{L_c\left[(n_1-n_2)-\lambda_c\frac{\partial}{\partial\lambda}(n_1-n_2)|_{\lambda=\lambda_n}\right]}$$

where $n_1$ and $n_2$ are the effective indices for the two guided modes. An example of the spectral response of the GACC filter used by/in accordance with one or more principles of the present invention, a sinc function, is shown below in FIG. 9.

Figure 9:
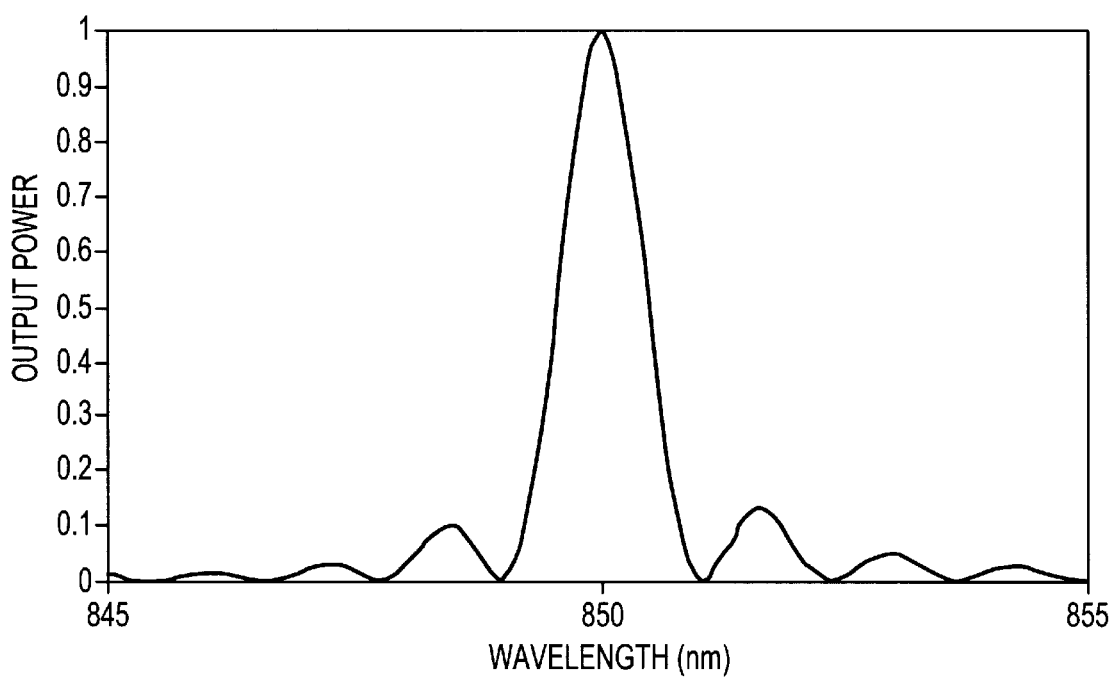
FIG. 9 is a plot of a spectral response of a grating-assisted, co-directional coupler of the reflective type in accordance with one or more principles of the present invention.
Figure 10A:
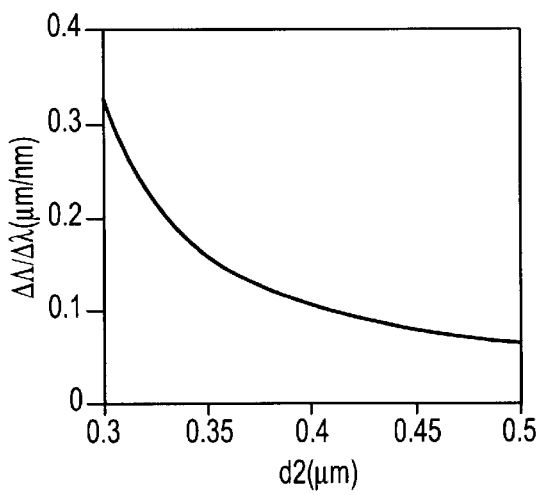
FIGS. 10a–d are plots of various characteristics of a grating-assisted, co-directional coupler of the reflective type in accordance with one or more principles of the present invention to illustrate the effect of changing the thickness of the upper guiding layer.
Figure 10B:
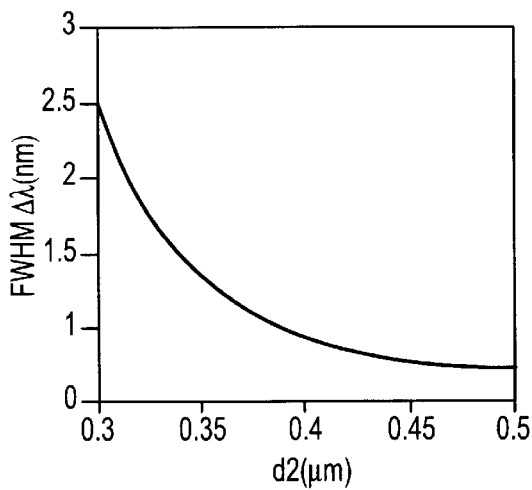
Figure 10C:
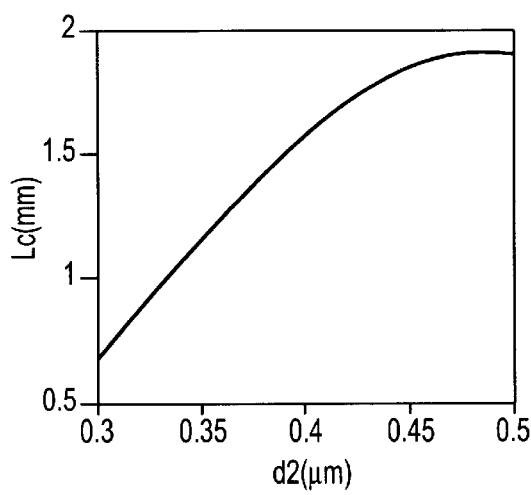
Figure 10D:
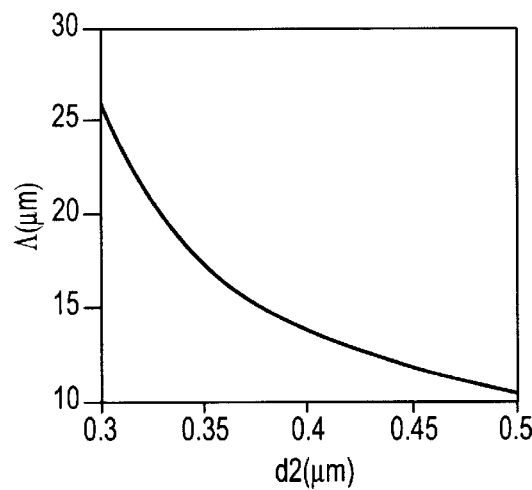
Figure 11A:
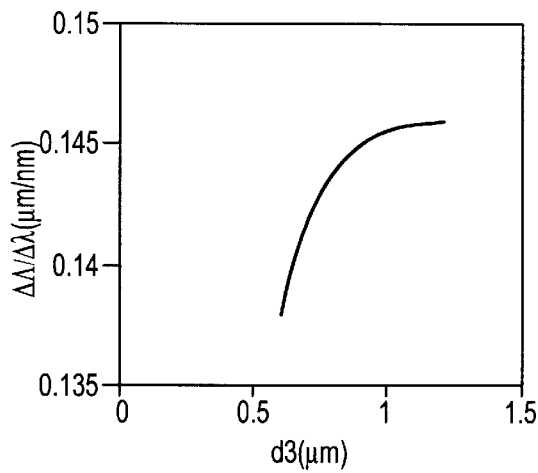
FIGS. 11a–d are plots of various characteristics a grating-assisted, co-directional coupler of the reflective type in accordance with one or more principles of the present invention to illustrate the effect of changing the thickness of the separation layer.
Figure 11B:
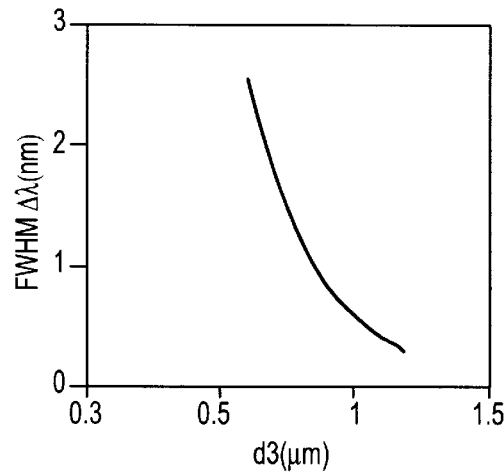
Figure 11C:
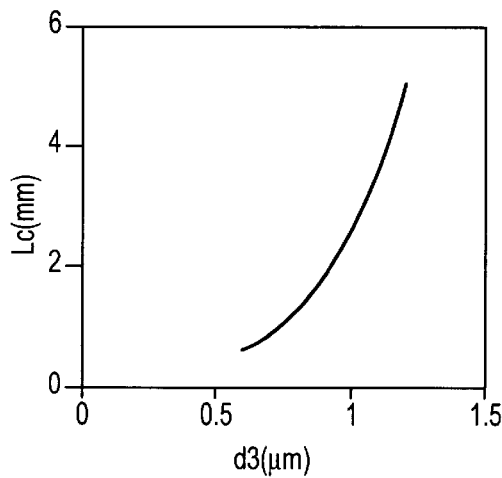
Figure 11D:
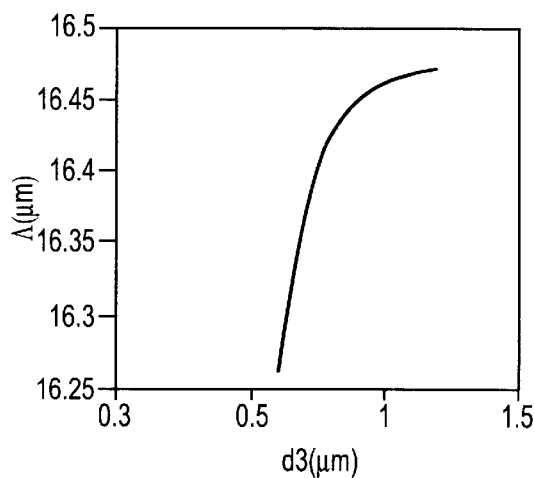
Figure 12A:
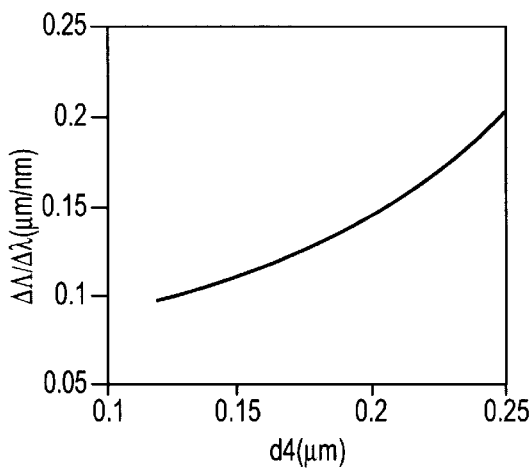
FIGS. 12a–d are plots of various characteristics of a grating-assisted, co-directional coupler of the reflective type in accordance with one or more principles of the present invention to illustrate the effect of changing the thickness of the lower guiding layer.
Figure 12B:
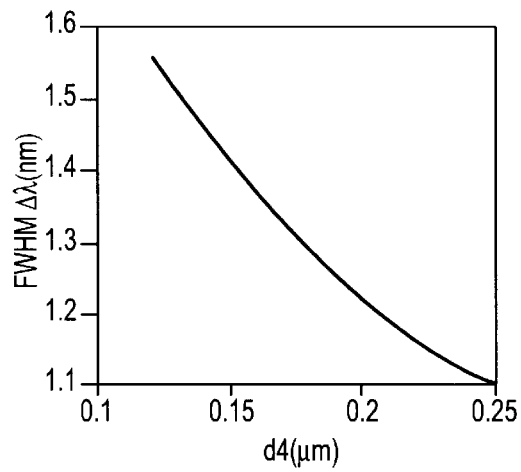
Figure 12C:
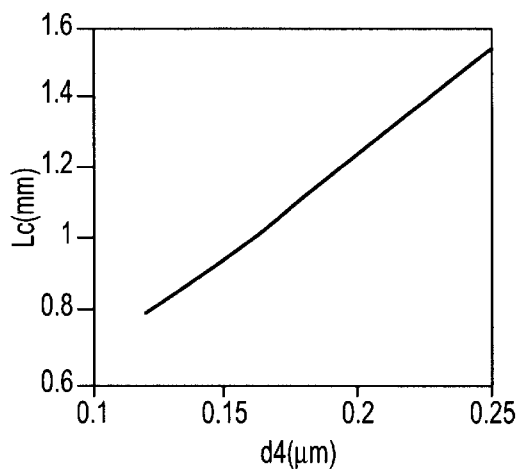
Figure 12D:
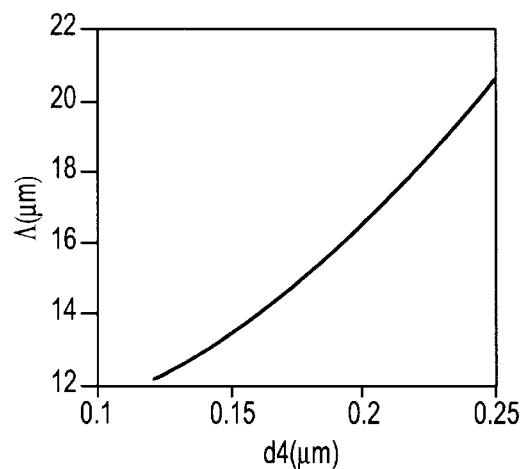
Figure 13A:
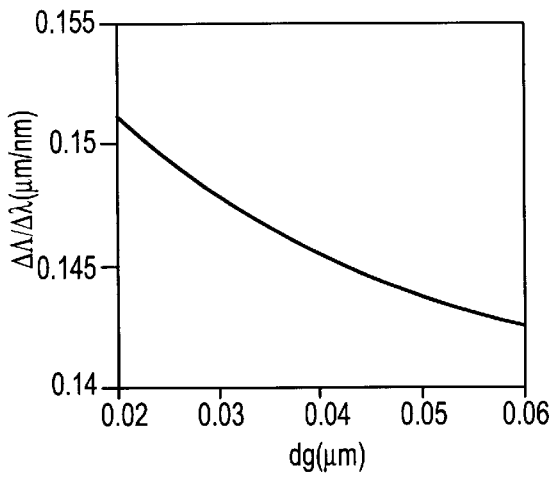
FIGS. 13a–d are plots of various characteristics of a grating-assisted, co-directional coupler of the reflective type in accordance with one or more principles of the present invention to illustrate the effect of changing the depth of the grating.
Figure 13B:
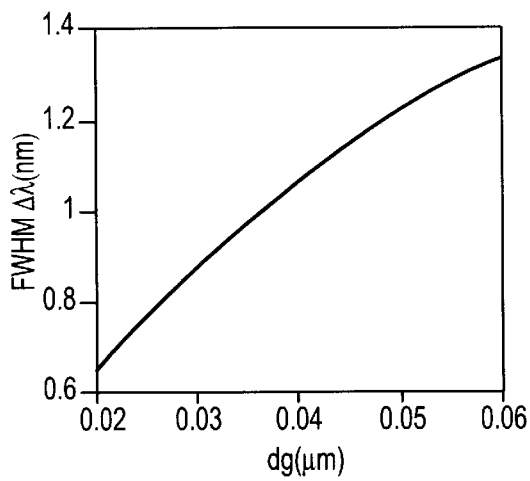
Figure 13C:
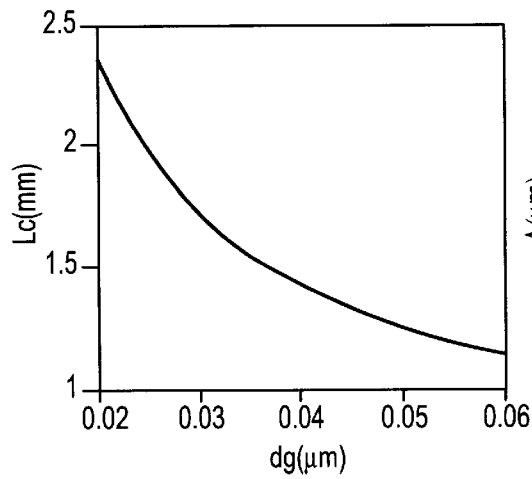
Figure 13D:
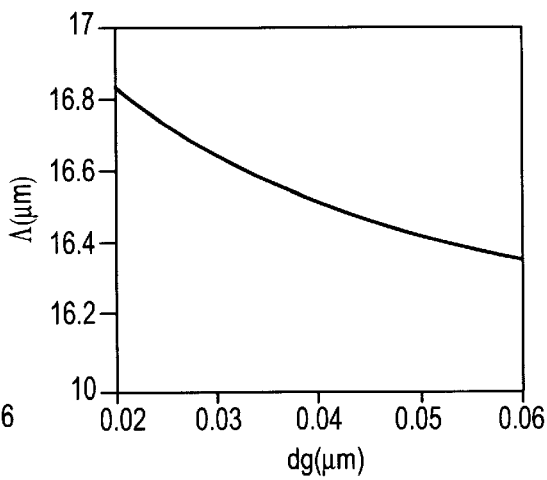
Figure 14A:
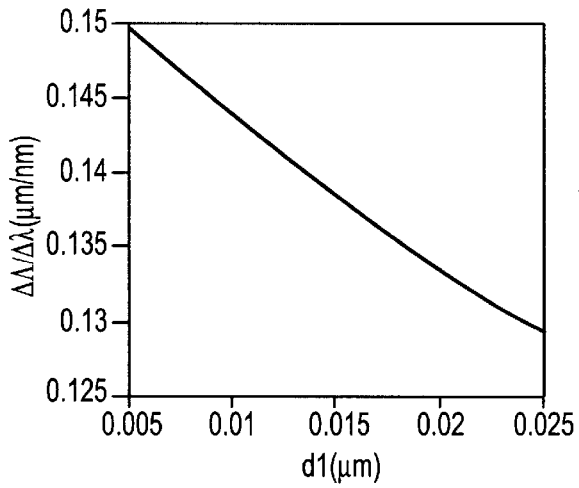
FIGS. 14a–d are plots of various characteristics of a grating-assisted, co-directional coupler of the reflective type in accordance with one or more principles of the present invention to illustrate the effect of changing the thickness of the etching-stop layer.
Figure 14B:
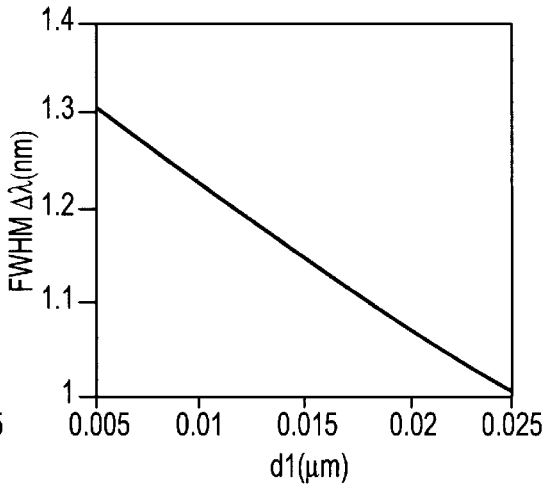
Figure 14C:
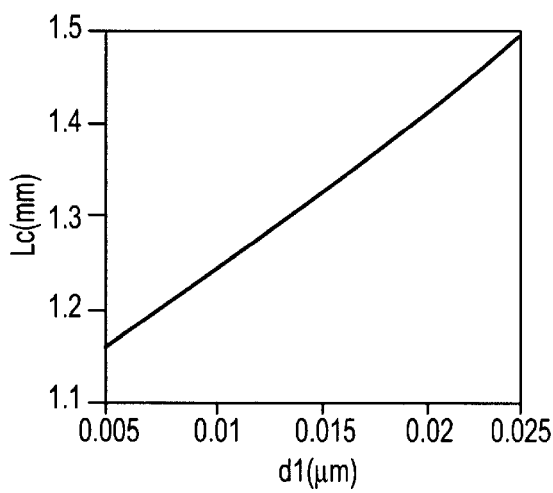
Figure 14D:
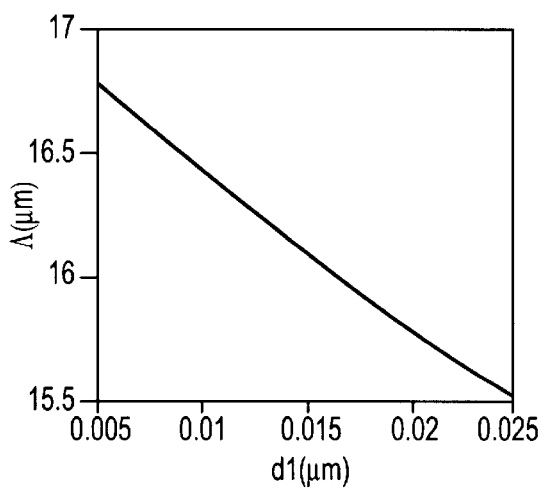
Figure 15A:
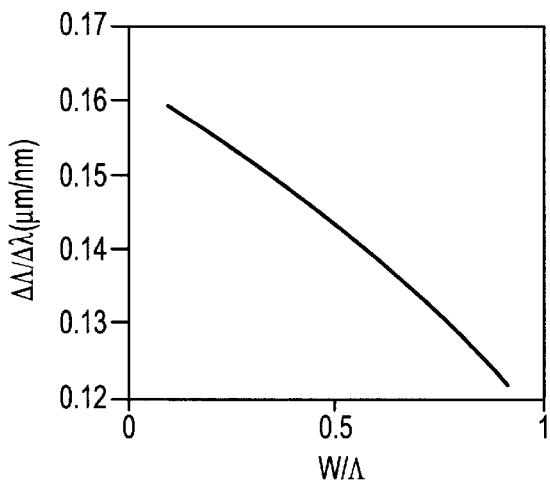
FIGS. 15a–d are plots of various characteristics of a grating-assisted, co-directional coupler of the reflective type in accordance with one or more principles of the present invention to illustrate the effect of changing the duty ratio of the rectangular grating.
Figure 15B:
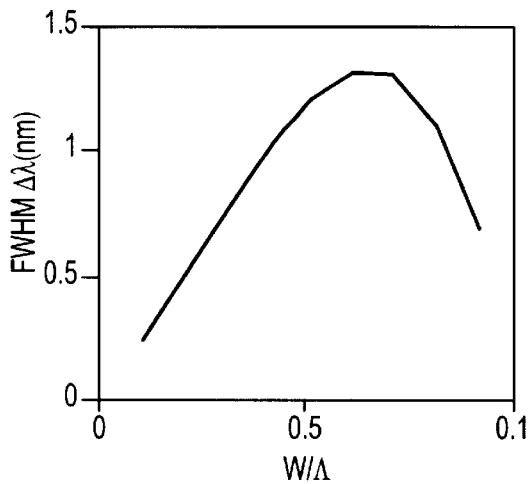
Figure 15C:
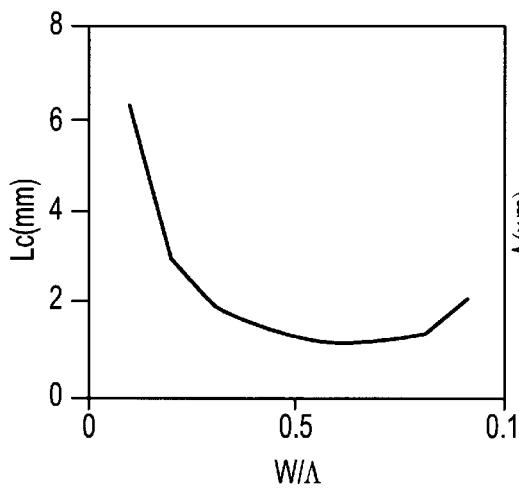
Figure 15D:
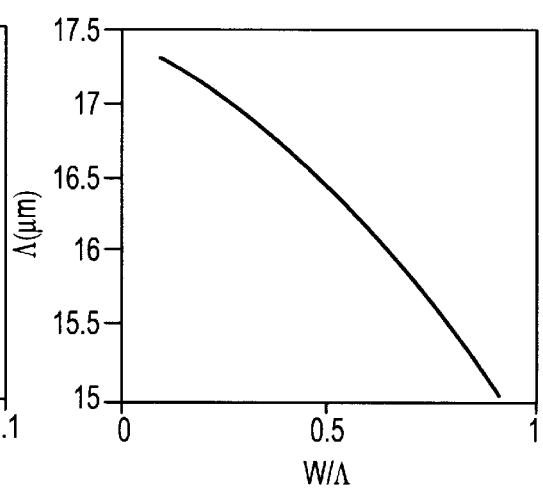

The dependence of FWHM on the device parameters is also shown in FIGS. 10–15. The larger the coupling length, the narrower the FWHM; however, the coupling length $L_c$ is limited by the size of the device and the loss requirement. Its dependence on the device parameters is also shown in FIGS. 10–15. Since all the parameters are inter-related, to get the design curves only one parameter is varied at a time with the other parameters fixed. The important structure parameters considered here are, as shown in FIG. 9:

$d_1$: the thickness of the etching-stop layer;
$d_2$: the thickness of the upper guiding layer;
$d_3$: the thickness of the separation layer;
$d_4$: the thickness of the lower guiding layer;
g: the depth of the grating layer;
W/$\Lambda$: the duty ratio of the rectangular grating.

The grating period $\Lambda$ and the coupling length $L_c$ will be determined by all the above parameters. These dependence plus the dependence of FWHM and $\Delta\Lambda/\Delta\lambda$ on the parameters are shown in FIGS. 10–15. In all these cases the parameters are within the range where there are only two guided modes in the entire structure, that is, there is only one guided mode in either the upper waveguide or the lower waveguide.

FIG. 10 illustrates characteristics of a GACC device in accordance with one or more principles of the present invention using $d_1$=0.01 $\mu$m, $d_3$=0.8 $\mu$m, $d_4$=0.2 $\mu$m, $d_g$=0.05 $\mu$m, w/$\Lambda$=0.5. The dependence of $\Delta\Lambda/\Delta\lambda$ on $d_2$, the thickness of the upper guide, is strong. A large $\Delta\Lambda/\Delta\lambda$ and small FWHM are desired and since both $\Delta\Lambda/\Delta\lambda$ and FWHM are decreasing as $d_2$ increases, we need to find an approximate point in the range. Here we choose $d_2$=0.36 $\mu$m since not only do $\Delta\Lambda/\Delta\lambda$ and FWHM fit the requirement but the coupling length $L_c$ of 1 mm is suitable for this device.

FIG. 11 illustrates characteristics of a GACC device in accordance with one or more principles of the present invention using $d_1$=0.01 $\mu$m, $d_3$=0.36 $\mu$m, $d_4$=0.2 $\mu$m, $d_g$=0.05 $\mu$m, and w/$\Lambda$=0.5. $\Delta\Lambda/\Delta\lambda$ is increasing and FWHM is decreasing as $d_3$, the thickness of the separation layer, increases so a larger $d_3$ seems to be better. But as $d_3$ increases the coupling length increases quickly and the changes of $\Delta\Lambda/\Delta\lambda$ and FWHM tend to be slow. This is because the two waveguides will eventually become isolated as $d_3$ increases. Beyond some level the change of $d_3$ will not appreciably affect the waveguides. Since the dependence of $\Delta\Lambda/\Delta\lambda$ on $d_3$ is very small as shown, $d_3$ is chosen based on the requirements for the FWHM and coupling length. The final value of $d_3$ chosen is 0.8 $\mu$m.

FIG. 12 illustrates characteristics of a GACC device in accordance with one or more principles of the present invention using $d_1$=0.01 $\mu$m, $d_2$=0.36 $\mu$m, $d_4$=0.2 $\mu$m, $d_g$=0.05 $\mu$m, and w/$\Lambda$=0.5. $\Delta\Lambda/\Delta\lambda$ is increasing and FWHM is decreasing as $d_4$, the thickness of the lower waveguide, increases. And the coupling length increases slowly in the range. So a larger $d_4$ is better, and chosen as $d_4$=0.2 $\mu$m.

FIG. 13 illustrates characteristics of a GACC device in accordance with one or more principles of the present invention using $d_1=0.01$ µm, $d_2=0.36$ µm, $d_3=0.8$ µm, $d_g=0.05$ µm, and w/Λ=0.5. $\Delta\Lambda/\Delta\lambda$ is decreasing very slowly and FWHM is increasing as g, the depth of the grating, increases. The coupling length $L_c$ is decreasing as g increases. Although g is very small compared to other dimensions of this structure but its effects on the FWHM and $L_c$ are significant. The value g=0.05 µm is chosen because the coupling length Lc and grating period Λ change relatively less around this value and the resulted $L_c$ is suitable.

FIG. 14 illustrates characteristics of a GACC device in accordance with one or more principles of the present invention using $d_2=0.36$ µm, $d_3=0.8$ µm, $d_4=0.2$ µm, g=0.05 µm, and w/Λ=0.5. Both $\Delta\Lambda/\Delta\lambda$ and FWHM are decreasing as $d_1$, the separation between the grating and the upper waveguide, increases. The dependence of $\Delta\Lambda/\Delta\lambda$ on $d_1$ is very small, and the coupling length is increasing as $d_1$ increases. So the smaller $d_1$ is preferred and set as $d_1=0.01$ µm.

FIG. 15 illustrates characteristics of a GACC device in accordance with one or more principles of the present invention using $d_1=0.01$ µm, $d_2=0.36$ µm, $d_3=0.8$ µm, $d_4=0.2$ µm, and g=0.05 µm. $\Delta\Lambda/\Delta\lambda$ is decreasing very slowly as w/Λ, the duty ratio of the grating, increases. For both FWHM and $L_c$ there is an optimum value for the duty ratio near 0.5. In the above cases, we always choose the duty ratio of the grating to be 0.5. The index perturbation of the periodic structure is the largest when w/Λ=0.5. The nearly flat shape around the optimum point is beneficial because it means that the small deviation from the optimum value does not change the device performance significantly. This small deviation is usual when the grating is etched, especially wet chemical etched.

Light that is directed through waveguides travels in one of two modes (TE or TM) that match the polarization of the light. These examples show the design for a device that operates on the TE-mode propagating through the waveguide. A slight modification of the grating, using the same conduit and output waveguides can couple the TM mode of the channel to the output waveguide. By using this in tandem with the TE-mode coupler and summing the two detector outputs, a polarization insensitive demultiplexer can be created.

Figure 16:
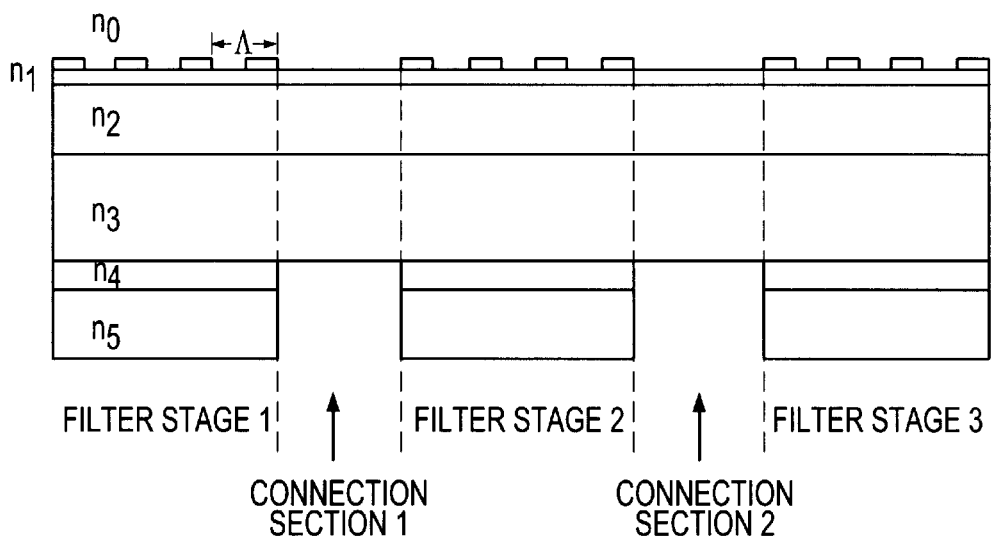
FIG. 16 is a schematic of an embodiment of a grating-assisted, co-directional coupler of the reflective type as a demultiplexer in accordance with one or more principles of the present invention.

The whole demultiplexer design in accordance with one or more principles of the present invention can be divided into filter section, determined above, and connection section. The layer structures of these two kinds of sections are different as shown in FIG. 16.

There are two guided modes in the filter section, in which the power of the even mode is confined in the upper waveguide layer, and there is only one guided mode in the connection section. At the output end of the filter section, the lightwave with phase-matching wavelength $\lambda_c$ has been coupled into the lower output waveguide layer and the lightwave with wavelength detuned from $\lambda_c$ remains in the upper waveguide layer.

The key to the creation of this rendition of the GACC in accordance with one or more principles of the present invention is the use of two-sided processing techniques. The entire vertical structure is grown at one time, eliminating the need for post-processing regrowth. A thin-film, stop-etch layer and a release layer are placed at the bottom of the structure. This allows the layers that form the two waveguides with their confining layers, the waveguide separation layer, and the grating formation layer to be removed from the substrate used in the material deposition process.

As an example, the release layer can be made of GaAs, followed by an AlAs stop-etch layer, or any other pair of materials that have highly preferential wet-chemical etch rate.

Initially, one of the waveguides is fabricated on the top of the wafer, using standard processing techniques. The wafer is then bonded top side down onto a support material using standard epoxy. The substrate is now removed using a combination of polishing and wet-chemical etching. Once the region of the release layers is reached, the preferential wet-chemical etching is used to remove the remaining excess material leaving the second waveguide/grating material exposed for processing. A backside mask alignment is then used to create the second waveguide, aligned to the first waveguide. Then the grating can be formed on the surface of the second waveguide, producing the GACC system in accordance with one or more principles of the present invention. The use of backside alignment processing and reflective grating coupling allows this device to be fabricated without the use of material regrowth.

There are two major categories of demultiplexers now in use for fiber optic communications systems. Both of these techniques begin by separating the multiple wavelength (N) data stream into N parts. In one instance each separate line contains a narrow-band optical filter, which is transparent to, only one of the data channel wavelengths and it absorbs the other wavelengths. In the other type of demultiplexers, a grating is fabricated on each of the N data lines. This grating allows only one of the data wavelengths to continue propagating in the optical fiber, and causes the other data wavelengths to disperse into the fiber cladding layers where they are absorbed. In each of these designs (N−1)/N portion of the optical power is lost in the demultiplexing process. This occurs since all data channels are present in each output line, and each output line rejects the (N−1) channels not matching with its particular channel wavelength.

In the dual-side waveguide-based wavelength demultiplexer in accordance with one or more principles of the present invention, only the desired channel wavelength is directed to the output waveguide, all other wavelengths continue to travel in the conduit waveguide. Thus none of the power in the other channels is lost during the demultiplexing process, allowing a low-loss demultiplexing process to occur.

Figure 17:
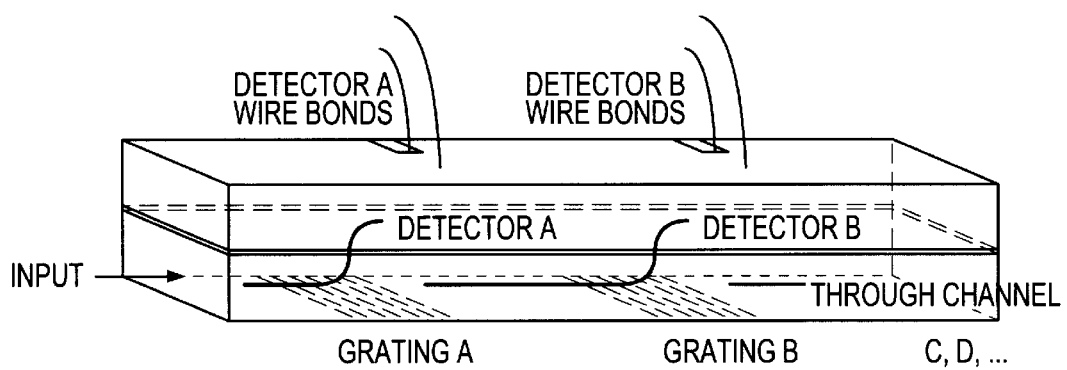
FIG. 17 is a schematic of an embodiment of a grating-assisted, co-directional coupler of the reflective type as a demultiplexer with integrated photodetectors in accordance with one or more principles of the present invention.

Since the device in accordance with one or more principles of the present invention is fabricated from semiconductor materials, detectors can be integrated directly into the output waveguides. To integrate the detector into the component, a detector that can sense all the wavelengths used for the various data channels is integrated into the output waveguide material. This can be done easily, by incorporating a p-i-n detector junction into the output waveguide. This detector is made the same material as the standard waveguide, but during the growth of the material the output waveguide layers are appropriately doped to form the detector region. The entire output waveguide will be turned into a detector for converting the data into an electrical signal. Standard electrical contacting is used to sense the current generated by the detector. As the detector is the same for all the wavelengths used in the module, it can be easily fabricated on all output waveguides simultaneously. Also, since it is on the opposite side of the structure from the coupling grating, it will not interfere in the grating creation. Integrating the optical detector into the demultiplexed output waveguide creates an efficient, little-cost module for appropriate system needs. One representative embodiment in this respect is illustrated in FIG. 17.

Figure 18:
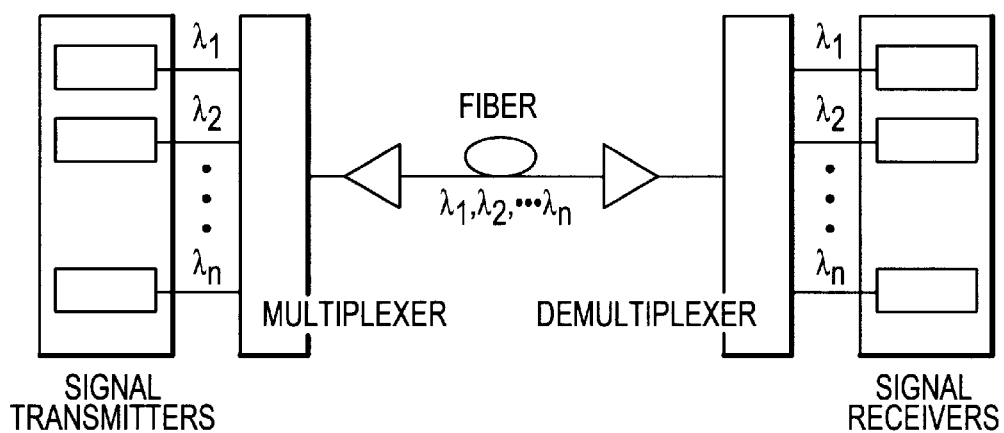
FIG. 18 is a schematic of a prior art wavelength division multiplexing system in the prior art.

With the dramatic development of the worldwide telecommunications network, more and more bandwidth for the carrier network is demanded to accommodate the explosively increased new traffic on the network. At present the network and telecommunication systems built from optical fiber backbone are substituting the old ones with traditional copper wire and coaxial cable, because of the inherent high optical bandwidth available in the optical fiber. The desire for further increased bandwidth requires the continuous development of the technique called wavelength-division multiplexing (WDM), in which a single fiber can carry many distinct signal channels at the same time. WDM is flourishing in the telecommunications world since the optical amplifier such as erbium-doped fiber amplifier (EDFA) is introduced. Presently the MUX/DEMUXs used in most commercial WDM products waste optical power due to the ineffective wavelength filtering. In general, these systems simply discard the signals at unwanted wavelengths in each filtering channel, which is avoided in this design. The basic function of WDM in accordance with the prior art is illustrated in FIG. 18.

WDM is used to combine and separate the optical signals of different wavelengths which are carried along a single fiber. This technique is an effective solution to the need for rapidly increasing transmission rates. The multiplexing and the demultiplexing are two basic functions in a WDM system. Multiplexer (MUX) is used to combine the optical signals of different wavelengths from different sources into a single fiber. On the contrary, the demultiplexer (DEMUX) separates the different signal channels and directs them to the different receivers. The MUX and DEMUX perform the reverse function of each other. Theoretically, if the DEMUX is operated backwards, it may act as a MUX.

To increase the number of possible channels the channel spacing should be as narrow as possible with minimal cross talk between signal channels. For long-haul telecommunications there are two wavelength windows around 1310 and 1550 nm. These windows are defined by the dispersionless wavelength bands of standard optical fibers. The International Telecommunications Union-Telecommunications Standards Sector (ITU-TSS) defined a minimum channel spacing of 100 GHz in the frequency domain corresponding to approximately 0.8 nm in that wavelength domain.

Commercial WDM products are available currently, which can provide 50/100/200 GHz (0.4/0.8/1.6 nm) channel spacing on ITU grid at 1310/1550 nm. The channel counts in systems using optical amplifiers can be 8, 16, 32 or higher. In most present commercial WDM products the demultiplexer utilize dielectric thin-film filters or fiber Bragg grating (FBG) filters. Large development programs have improved the stability, reliability and performance of these devices. Using the most mature thin-film filters, 100 GHz (0.8 nm) spacing muxes-demuxes are commercially available with their small size and adjacent channel isolation of >25 dB. For narrower spacing Dense-WDM (DWDM) (50 GHz/0.4 nm), however, fiber Bragg gratings (FBGs) techniques are more attractive. These techniques suffer from low optical efficiency and high fabrication costs. These approaches will provide not only the usual performance features but also some new advantages. The reflective-GACC demultiplexer in accordance with one or more principles of the present invention will be able to be monolithically integrated with other optoelectronic devices, which will make the WDM modules more compact, stable and reproducible.

Figure 19:
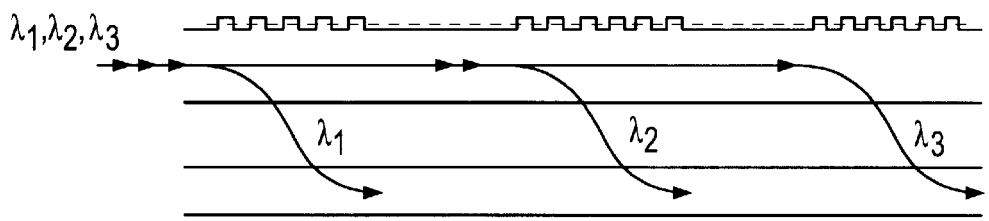
FIG. 19 is a schematic of an embodiment of a grating-assisted, co-directional coupler of the reflective type as a demultiplexer in a WDM application in accordance with one or more principles of the present invention.

FIG. 19 illustrates the WDM application of the reflective GACC filter used by/in accordance with one or more principles of the present invention. The lightwaves of different wavelengths are first coupled into the upper of the two waveguide layers. Without the grating, the lightwaves will remain propagating in the upper, conduit waveguide. However, with the help of the gratings, the different signals can be separated by wavelength and coupled to the output waveguide layer in a cascading manner. For development work this device can be made of GaAs/AlGaAs material system. The techniques of material growth and device processing on GaAs-based optoelectronics are relatively mature. Semiconductor laser diodes and photodetectors made of GaAs/AlGaAs and InGaAs/AlGaAs for optical communication systems are already standard devices used in many commercial systems. The use of III-V group material make it possible to monolithically integrate this passive WDM device with other devices such as light sources (laser diodes), optical amplifiers and optical detectors. These totally integrated optic circuits are very suitable for high-speed optical communication systems. Although this device will be proven in the GaAs/AlGaAs material system (suitable for short-haul communication systems), the designs can be propagated into the InGaAsP/InP material system for use at 1310/1550 nm wavelengths (used in long-haul communications systems). Generally, the only limiting factor in relation to wavelengths is that the waveguides be transparent at the wavelength(s) of interest. As such, the present invention may be used anywhere throughout the 1300–1600 nm wavelength range, that may be of interest to long-haul telecommunications. All that is required is that the waveguide design and grating pitch be adapted to the desired wavelength(s).

Optical Switch Embodiments

Figure 20:
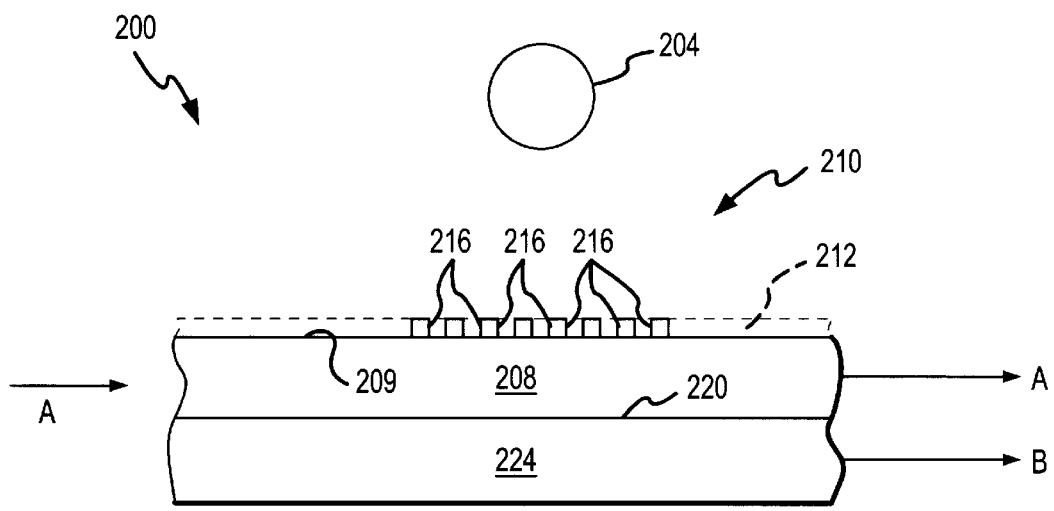
FIG. 20 is one embodiment of an optical switch with a pair of stacked waveguides and an optically-induced grating for controlling the coupling between these waveguides.

One embodiment of an optical switch 200 is presented in FIG. 20. The optical switch 200 generally includes a light source 204, a first waveguide 208, and a second waveguide 224. Generally, an optical signal enters the first waveguide 208 and travels through the first waveguide 208 at least generally in the direction of the arrow A when the switch 200 is in a first mode. Typically, this optical signal will be of a single, specific wavelength, although there may be applications where the optical signal is of a plurality of wavelengths. In any case, when the switch 200 is in a different, second mode, this optical signal is redirected from the first waveguide 208 and into the second waveguide 224, and thereafter travels through the second waveguide 224 at least generally in the direction of the arrow B. Therefore, the optical switch 200 provides a single input channel (that portion of the first waveguide 208 that is "upstream" of a plurality of slits 216 of an optically-induced grating assembly 210 to be discussed below), and two discrete optical output paths or channels in the form of the second waveguide 224 and that portion of the first waveguide 208 that is "downstream" of the noted plurality of slits 216.

One component of the switch 200 that is utilized in the above-noted switching function is a separation layer or barrier 220 that is disposed between and that physically separates the first waveguide 208 from the second waveguide 224. Light that is traveling through the first waveguide 208 in the direction of the arrow A in FIG. 20 is precluded from entering and traveling through second waveguide 224 by the barrier 220 when the optical switch 200 is in its first mode. However, once the optical switch 200 is in its second mode, the first waveguide 208 and the second waveguide 224 become optically coupled to allow the optical signal from the first waveguide 208 to pass through the barrier 220 and into the second waveguide 224 for progression through the second waveguide 224 at least generally the direction of the arrow B. Light that is traveling though the second waveguide 224 at least generally in the direction of the arrow B is similarly precluded from passing back through the barrier 220 and traveling through the first waveguide 208 when the optical switch 200 is in its second mode. The various properties and characteristics discussed above in relation to the first waveguide 44, second waveguide 72, and barrier layer 68 of the demultiplexer 40 may be utilized by the first waveguide 208, the second waveguide 224, and the barrier 220, respectively, of the optical switch 200 of FIG. 20.

At least certain aspects of the optical switch 200 are the same as those of the above-described demultiplexer 400, including without limitation in relation to the basic fundamental characteristics or properties of stacked waveguides and an intermediate separation or barrier layer as noted. One primary and fundamental difference between the demultiplexer 40 and the optical switch 200 is the mechanism for achieving or affecting the optical coupling between a pair of stacked waveguides. Recall that the demultiplexer 40 uses a fixed or permanent grating assembly 52 to provide the optical coupling function. In contrast, the optical switch 200 uses what may be characterized as an optically-induced grating of sorts to provide the optical coupling function.

The two modes of the optical switch 200 are provided by a light source 204 and an optical mask 212 having at least one slit or aperture 216 formed therein, and which collectively define what may be characterized as an optically-induced grating assembly 210 for the optical switch 200. The optical mask 212 is disposed over at least a portion of an upper surface 209 of the first waveguide 210 (that surface of the first waveguide 208 that is opposite that which interfaces with the barrier 220). The optical mask 212 may be disposed over the entirety of the upper surface 209 of the first waveguide 208 (shown in dashed lines), or only over a portion of the upper surface 209 (e.g., over an area that is large enough to totally encompass any light beam that may be directed from the light source 204 toward the first waveguide 208 to provide the switching function to be described). In one embodiment, the optical mask 212 is opaque and formed from materials such as an appropriate metal or polyimid. However, a certain degree of functionality may be realized by the optical switch 200 utilizing an optical mask 212 that is semi-transparent. Semi-transparent materials may in fact actually enhance the efficiency of the optically-induced grating within the first waveguide 208 in certain situations.

The optical mask 212 includes at least one and more preferably a plurality of slits or apertures 216. Spacing selection between adjacent slits 216 may enhance the transfer of the optical signal from the first waveguide 208 to the second waveguide 224. Multiple slits or apertures 216 that are spaced at least generally in a direction in which an optical signal travels through the first waveguide 208 is preferred in order to increase the amount of the optical signal that is directed through the barrier 220 and into the second waveguide 224. This is commonly characterized as an extinction ratio, and in the case of the optical switch 200 the extinction ratio is preferably at least about 20:1 (the ratio of the amount of the optical signal that is directed into the second waveguide 224 via the grating assembly 210, to the amount of the optical signal that continues through the upper waveguide 208 beyond the slits 216 of the optically-induced grating assembly 210). In one embodiment, there are at least about 6 slits 216 spaced in the noted manner, while in another embodiment there are at least about 20–30 slits 216 spaced in the noted manner, while in yet another embodiment there are at least about 100 slits 216 spaced in the noted manner. Extinction ratios of about 20:1 or more will likely require on the order of about 100 slits 216.

Preferably, each slit 216 extends through the entire vertical extent of the optical mask 212 to expose at least one discrete region on the upper surface 209 of the first waveguide 208. However, a certain degree of functionality may be realized by the optical switch 200 utilizing an optical mask 212 with one or more slits 216 that extend only partially through the thickness of the optical mask 212, so long as the material from which the optical mask 212 is formed is at least semi-transparent in this situation. That is, the optical mask 212 and its plurality of slits 216 may be characterized as providing for two different and distinct degrees of transparency. These two different degrees of transparency allow for the creation of an optically-induced grating within the first waveguide 208 by changing the index of refraction within the first waveguide 208. Generally, the regions defined by the optical mask 212 have a transparency that is less than the transparency of the regions defined by the plurality of slits 216.

Light from the light source 204 that is directed toward the first waveguide 208 in general changes the index of refraction of the first waveguide 208 at the local level within the first waveguide 208 (at least to a certain depth within the first waveguide 208). "Local level" means the individual crystals within the first waveguide 208. This change in the index of refraction at the local level within the first waveguide 208 by turning on/off the light source 204 is virtually instantaneous in that there is little to no hysteresis (i.e., the change in index of refraction of the individual crystals is effectively instantaneous). This change in index of refraction provides the two modes for the optical switch 200 by allowing the optical signal to interface with the barrier 220 at a steep enough angle to pass through the barrier 220 and into the second waveguide 224. Another way of characterizing the switching function of the optical switch 200 is that it is based upon the photo refractive effect.

In one embodiment: 1) when the light source 204 is "off," the first waveguide 208 and the second waveguide 224 are optically "decoupled" and the optical signal will progress only through the first waveguide 208 at least generally in the direction of the arrow A illustrated in FIG. 20 (i.e., the optical signal will not pass through the barrier 220 and into the second waveguide 224 in this instance); and 2) when the light source 204 is "on" such that light is directed onto the optical mask 212 and into the slits 216, the index of refraction of the first waveguide 208 will be modified in such a manner such that the optical signal from the first waveguide 208 will be able to pass through the barrier 220 and enter the second waveguide 224 to progress through the second waveguide 224 at least generally the direction of the arrow B. It may also be possible to "reverse" the foregoing, in that in another embodiment: 1) when the light source 204 is "on" such that light is directed onto the optical mask 212 and into the slits 216, the first waveguide 208 and the second waveguide 224 are optically "decoupled" and the optical signal will progress only through the first waveguide 208 at least generally in the direction of the arrow A illustrated in FIG. 20 (i.e., the optical signal will not pass through the barrier 220 and into the second waveguide 224 in this instance); and 2) when the light source 204 is "off", the index of refraction of the first waveguide 208 will be modified in such a manner such that the optical signal from the first waveguide 208 will be able to pass through the barrier 220 and enter the second waveguide 224 to progress through the second waveguide 224 at least generally the direction of the arrow B.

The light source 204 may be characterized as issuing a control beam for controlling the operation of the optical switch 200 by changing the index of refraction of the first waveguide 208. Generally, light from the light source 204 will illuminate at least a portion of the surface of the optical switch 200 that includes the optical mask 212. The optical mask 212 at least substantially precludes the transmission of this light through the optical mask 212 in a preferred embodiment and to the first waveguide 208. However, the presence of the slits 216 through the optical mask 212 allows light from the light source 204 to form a pattern on the top surface 209 of the first waveguide 208 or so as to otherwise allow for a sufficient change in the index of refraction at the local level within the first waveguide 208.

Selection of a proper wavelength for the light source 204 allows for the production of optically-induced carriers within the first waveguide 208 at the local level by the illumination of discrete regions of the first waveguide 208 via the slits 216. Generally, the control beam from the light source 204 needs to have at least one wavelength where the energy of the photon is larger than the band gap of the material defining the first waveguide 208 in order to "free" one or more carriers from the atoms of the material defining the first waveguide 208 to affect the desired change in the index of refraction. Stated another way, the wavelength of interest in the control beam from the light source 204 must be shorter than the energy band gap.

It is the optically-induced carriers within the first waveguide 208 that modify the effective optical index of the first waveguide 208 and produce an optically-induced grating that satisfies the coupling condition for the first waveguide 208 and the second waveguide 224. Since this optically-induced grating does not require the long-range transport of carriers in the first waveguide 208, the optical switch 200 has at least the possibility of high speed operation (GHz). That is, the optical switch 200 is based upon changing the properties of the first waveguide 208 at localized and discrete areas, or at the crystal level, and these changes redirect the optical signal through the barrier 220 and into the second waveguide 224. One way to characterize the effect of the light source 204 on the first waveguide 208 is that it induces a photo refractive effect locally within the first waveguide to allow an optical signal from the first waveguide 208 to pass through the barrier 220 and enter the second waveguide 224.

Fundamentals of the optical switch 200 may be utilized in any appropriate application and in any appropriate manner. One implementation would be as a directional optical switch as described, namely by providing a single input channel and at least two separate and distinct output channels. Another implementation would be to use the optical switch 200 in an on/off optical switching application. Yet another implementation of the optical switch 200 would be to include one or more detectors (e.g., semiconductor detectors) on one or both of the first waveguide 208 and the second waveguide 224 at a location that is "downstream" of the optically-induced grating assembly 210.

The basic principles for making the demultiplexer 40 may be utilized to make the optical switch 200. Generally, a number of the layers that define the noted components of the optical switch 200 may be sequentially formed on a first substrate. In one embodiment, a thin-film, stop-etch layer and a release layer are formed on the first substrate, followed by the layer that will define the first waveguide 208, followed by the layer that will define the barrier 220, and followed by the layer that will define the second waveguide 224. The layer that will define the second waveguide 224 may then be patterned to define the second waveguide 224 (e.g., via etching a pair of laterally spaced and longitudinally extending grooves to define the second waveguide 224 in the form of a protrusion of sorts).

The assembly thus far defined may then be inverted and mounted on a second substrate such that the second waveguide 224 now interfaces with this second substrate. Any standard epoxy may be used for this attachment to the second substrate. The first substrate may then be removed by standard semiconductor processing techniques (e.g., polishing and wet-chemical etching), followed by removal of the release layer and stop-etch layer by standard semiconductor processing techniques as well (e.g., wet etching). One option would be to then form a layer on the layer that is to define the first waveguide 208, to pattern this layer to define the optical mask 212 and the plurality of slits 216, and to thereafter define the lateral extent of the first waveguide 208 (e.g., via etching a pair of laterally spaced and longitudinally extending grooves to define the first waveguide 208 in the form of a protrusion of sorts). Another option would be to define the lateral extent of the first waveguide 208 in the noted manner, and to then form a layer on the upper surface of this first waveguide 208 and to thereafter pattern the same to define the optical mask 212 and slits 216.

Figure 21:
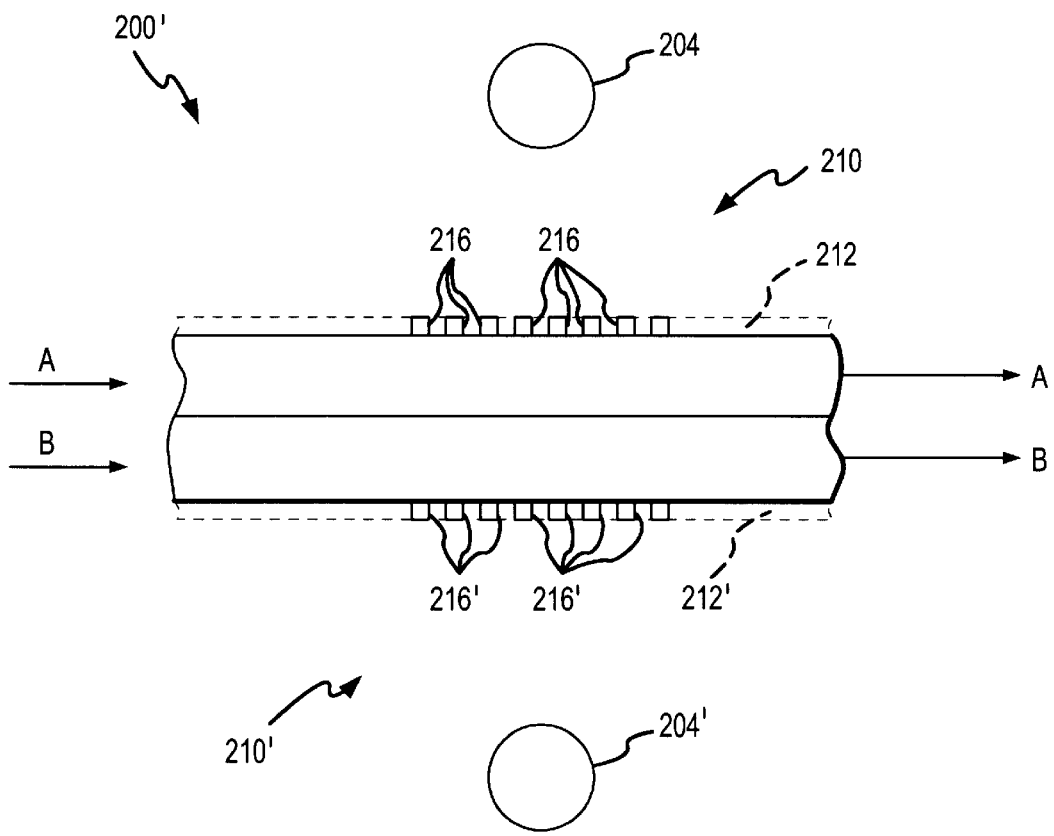
FIG. 21 is another embodiment of an optical switch with a pair of stacked waveguides and an optically-induced grating on each waveguide for controlling the coupling between these waveguides.

Another embodiment of an optical switch with a pair of waveguides is illustrated in FIG. 21. Components of the optical switch 200' that correspond with those of the optical switch 200 of FIG. 21 are identified by the same reference numeral. The "single prime" designation is used in relation to the FIG. 21 embodiment as in indication that there are differences between the two embodiments. In this regard, instead of a single optically-induced grating assembly, the optical switch 200' includes not only an optically-induced grating assembly 210 for the first waveguide 208, but an optically-induced grating assembly 210' for the second waveguide 224 as well. The optically-induced grating assembly 210' is the same as the optically-induced grating assembly 210, except that it is associated with the second waveguide 224 versus the first waveguide 208. As such, the optically-induced grating assembly 210 controls the transfer of an optical signal from the first waveguide 208 to the second waveguide 224 via a change in the index of refraction over discrete areas of the first waveguide 208, while the optically-induced grating assembly 210' controls the transfer of the optical signal from the second waveguide 224 to the first waveguide 208 via a change in the index of refraction over discrete areas of the second waveguide 224.

It should be appreciated that the same structures used by the optical switches 200, 200' may also be used to provide a modulation function.

Theoretical Analysis—Optical Switch Embodiments

The above-noted "Theoretical Analysis—Demultiplexer Embodiment" is equally applicable to the optical switches 200 and 200', except that the grating in relation to the switches 200 and 200' are optically-induced versus permanent.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A demultiplexer, comprising:
a first waveguide comprising first and second opposing surfaces, wherein said first waveguide comprises an input channel for a combined optical signal;
a second waveguide comprising first and second opposing surfaces, wherein said second waveguide is disposed at a higher elevation than said first waveguide whereby said second surface of said first waveguide is disposed between said first surface of said first waveguide and said second waveguide, and wherein said first surface of said second waveguide is disposed between said second surface of said second waveguide and said first waveguide, wherein said first surface of said first waveguide comprises a grating assembly, wherein said second surface of said second waveguide comprises at least one photodetector, wherein said grating assembly comprises a plurality of grating subassemblies that are spaced in a general direction in which said combined optical signal travels through said first waveguide, wherein each said grating subassembly is a reflective grating, and wherein each said grating subassembly is wavelength specific.

2. A demultiplexer, as claimed in claim 1, wherein:
said optical signal comprises a plurality of wavelength specific optical signals, wherein said second waveguide comprises a plurality of output channels for said plurality of wavelength specific optical signals, wherein each said wavelength specific signal is selected from the group consisting of a specific wavelength and a wavelength band.

3. A demultiplexer, as claimed in claim 1, wherein:
said second waveguide comprises a plurality of second waveguide sections that are spaced in said general direction in which said combined optical signal travels through said first waveguide, wherein each said second waveguide section comprises first and second surface sections, wherein said second surface section of each of said plurality of second waveguide sections collectively define said second surface of said second waveguide.

4. A demultiplexer, as claimed in claim 3, wherein:
said second surface section of each said second waveguide section comprises a separate photodetector.

5. A demultiplexer, as claimed in claim 4, wherein:
each said second waveguide section consists essentially of its corresponding said photodetector.

6. A demultiplexer, as claimed in claim 4, wherein:
said photodetector associated with said second surface section of each said second waveguide section defines only a portion of its corresponding said second waveguide section.

7. A demultiplexer, as claimed in claim 1, further comprising:
a barrier layer disposed between said second surface of said first waveguide and said first surface of said second waveguide.

8. A demultiplexer, as claimed in claim 7, wherein:
said barrier layer comprises means for limiting a passage of light between said first and second waveguides to light that is directed from said grating assembly toward said barrier layer and said second waveguide.

9. A demultiplexer, as claimed in claim 7, wherein:
said second waveguide comprises a plurality of spaced second waveguide sections, wherein said barrier layer comprises a plurality of spaced barrier layer sections.

10. A demultiplexer, as claimed in claim 9, wherein:
each of said plurality of spaced barrier layer sections is at least substantially identical.

11. A demultiplexer, as claimed in claim 7, wherein:
each of said second waveguide and said barrier layer are continuous structures.

12. A demultiplexer, as defined in claim 1, wherein:
said optical signal comprises a plurality of wavelength specific optical signals, wherein said second waveguide comprises a plurality of second waveguide sections which are spaced in said general direction in which said combined optical signal travels through said first waveguide, wherein each said second waveguide section is associated with a wavelength specific optical signal wherein each said wavelength specific signal is selected from the group consisting of a specific wavelength and a wavelength band.

13. A demultiplexer, as claimed in claim 1, wherein:
said grating assembly comprises a plurality of grating subassemblies that are spaced at least generally in a general direction in which light travels through said first waveguide.

14. A demultiplexer, as claimed in claim 1, wherein:
each said grating subassembly comprises first means for directing light of a first polarity and a predetermined wavelength band to said second waveguide and second means for directing light of a second polarity and said predetermined wavelength band to said second waveguide, and wherein each said wavelength band is selected from the group consisting of a specific wavelength and a range of wavelengths.

15. A demultiplexer, as claimed in claim 1, wherein:
each said grating subassembly is associated with a different wavelength band, wherein each said grating subassembly comprises a first grating section that uses a first grating spacing, followed by a second grating section in relation to said general direction in which said combined optical signal travels through said first waveguide and that uses a second grating spacing that is different than said first grating spacing used by said first grating section in the same said grating subassembly, wherein said first grating section directs light of one polarity and at its associated said wavelength band to said second waveguide, wherein said second grating section directs light of another polarity and at its associated said wavelength band to said second waveguide, and wherein each said wavelength band is selected from the group consisting of a specific wavelength and a range of wavelengths.

16. A demultiplexer, as claimed in claim 15, wherein:
a difference between said first and second grating spacings of any said grating subassembly is significantly less than a difference in said first grating spacing in said first grating section between any adjacent pair of said grating subassemblies.

17. A demultiplexer, as claimed in claim 15, wherein:
said first and second grating spacings in each said grating subassembly differ by an amount that is within a range of about 0.1 microns to about 0.5 microns.

18. A demultiplexer, as claimed in claim 17, wherein:

a minimum difference in magnitude between said first grating spacing of said first grating section between each adjacent pair of said grating subassemblies is about 1 micron.

19. A demultiplexer as claimed in claim 1, wherein:

said at least one photodetector comprises a separate photodetector for each said grating subassembly.

20. A demultiplexer, as claimed in claim 1, wherein:

said grating assembly comprises a plurality of reflective gratings that are spaced in a general direction in which light travels through said first waveguide.

21. A demultiplexer, as claimed in claim 1, wherein:

said first and second waveguides are asynchronous.

22. A demultiplexer, as claimed in claim 1, wherein:

said second surface of said second waveguide comprises a plurality of photodetectors that are each specific to a different wavelength band.

23. A demultiplexer, as claimed in claim 1, wherein:

said first and second waveguides have first and second refractive indices and first and second thicknesses between their respective said first and second surfaces, respectively, wherein said first and second refractive indices are different and wherein said first and second thicknesses are different.

24. A demultiplexer, as claimed in claim 1, wherein:

said first waveguide comprises an input channel and said second waveguide comprises at least one output channel.

25. A demultiplexer, comprising:

a first waveguide comprising first and second opposing surfaces;

a second waveguide disposed in stacked relation to said first waveguide; and a grating assembly associated with said first waveguide, wherein said grating assembly comprises a plurality of grating subassemblies that are spaced at least generally in a general direction in which light travels through said first waveguide, wherein each said grating subassembly is associated with a different wavelength band, wherein each said grating subassembly comprises a first grating section that uses a first grating spacing, followed by a second grating section in relation to a general direction in which light travels through said first waveguide and that uses a second grating spacing that is different than said first grating spacing used by said first grating section in the same said grating subassembly, wherein said first grating section directs light of one polarity and at its associated said wavelength band to said second waveguide, wherein said second grating section directs light of another polarity and at its associated said wavelength band to said second waveguide, and wherein each said wavelength band is selected from the group consisting of a specific wavelength and a range of wavelengths.

26. A demultiplexer, as claimed in claim 25, wherein:

said first waveguide comprises an input channel for a combined optical signal and said second waveguide comprises a plurality of output channels for a plurality of different said wavelength bands.

27. A demultiplexer, as claimed in claim 25, wherein:

said different wavelength band associated with each of said grating subassemblies comprises at least one individual wavelength.

28. A demultiplexer, as claimed in claim 25, wherein:

a difference between said first and second grating spacings of any said grating subassembly is significantly less than a difference in said first grating spacing in said first grating section between any adjacent pair of said grating subassemblies.

29. A demultiplexer, as claimed in claim 25, wherein:

said first and second grating spacings in each said grating subassembly differ by an amount that is within a range of about 0.1 microns to about 0.5 microns.

30. A demultiplexer, as claimed in claim 29, wherein:

a minimum difference in magnitude of said first grating spacing in said first grating section between each adjacent pair of said grating subassemblies is about 1 micron.

31. A demultiplexer, as claimed in claim 25, further comprising:

a separate photodetector for each said grating subassembly.

32. A demultiplexer, as claimed in claim 25, wherein:

said second waveguide comprises a plurality of second waveguide sections that are spaced in a general direction in which light travels through said first waveguide.

33. A demultiplexer, as claimed in claim 32, further comprising:

a photodetector associated with each said second waveguide section.

34. A demultiplexer, comprising:

a first waveguide comprising first and second opposing surfaces;

a second waveguide comprising first and second opposing surfaces, wherein said second waveguide is disposed at a higher elevation than said first waveguide whereby said second surface of said first waveguide is disposed between said first surface of said first waveguide and said second waveguide, and wherein said first surface of said second waveguide is disposed between said second surface of said second waveguide and said first waveguide; and a grating assembly disposed on said first surface of said first waveguide, wherein said grating assembly comprises a plurality of grating subassemblies that are spaced at least generally in a general direction in which light travels through said first waveguide, wherein each said grating subassembly comprises first and second grating sections that are disposed at different longitudinal positions in relation to a general direction in which light travel through said first waveguide, wherein said first and second grating sections of each said grating subassembly use first and second grating spacings that are of different magnitudes, and wherein a difference between said first and second grating spacings of any said grating subassembly is significantly less than a difference in grating spacings in said first grating section of any adjacent pair of said grating subassemblies.

35. A demultiplexer, comprising:

a first waveguide comprising first and second opposing surfaces;

a second waveguide disposed in stacked relation to said first waveguide; and a grating assembly associated with said first waveguide, wherein said grating assembly comprises a plurality of grating subassemblies that are spaced at least generally in a general direction in which light travels through said first waveguide, wherein each said grating subassembly comprises first and second grating sections that are disposed at different longitudinal positions in relation to a general direction in which light travel through said first waveguide, wherein said first and second grating sections of each said grating subassembly use first and second grating spacings that are of different magnitudes, wherein a difference between said first and second grating spacings of any said grating subassembly is significantly less than a difference in grating spacings in said first grating section of any adjacent pair of said grating subassemblies.

* * * * *